July 6, 1965

G. T. McCLURE 3,193,191

ROTARY COMPRESSOR

Filed Oct. 27, 1961

INVENTOR.
GLENN T. McCLURE
BY
a. a. Steinmiller
ATTORNEY

July 6, 1965

G. T. McCLURE 3,193,191

ROTARY COMPRESSOR

Filed Oct. 27, 1961

INVENTOR.
GLENN T. McCLURE
BY
a. a. Steinmiller
ATTORNEY

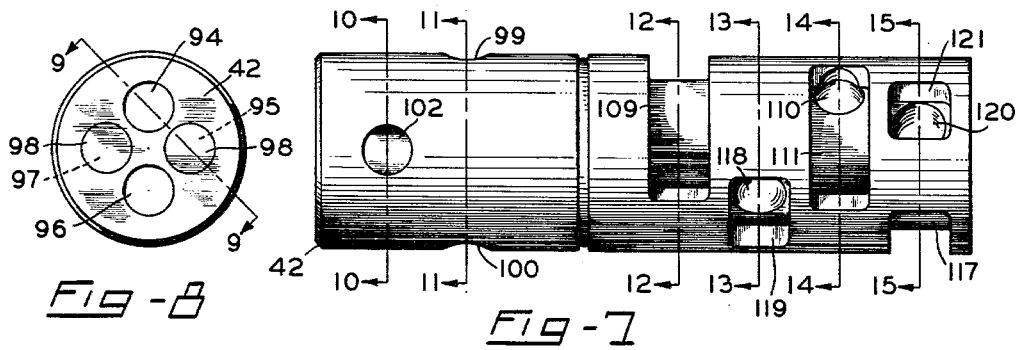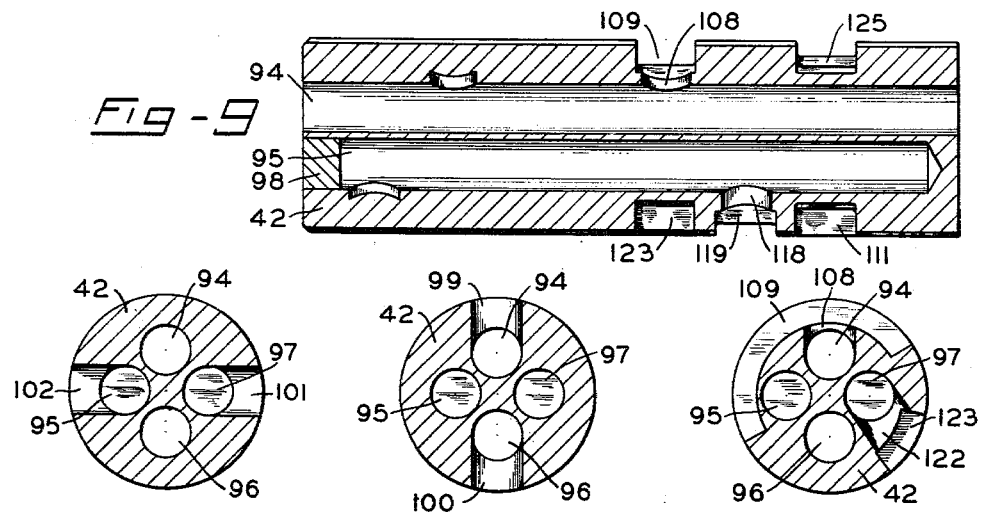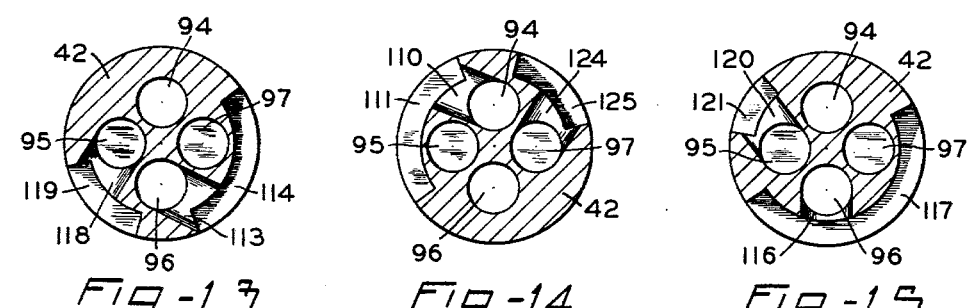

July 6, 1965  G. T. McCLURE  3,193,191
ROTARY COMPRESSOR
Filed Oct. 27, 1961  12 Sheets-Sheet 7
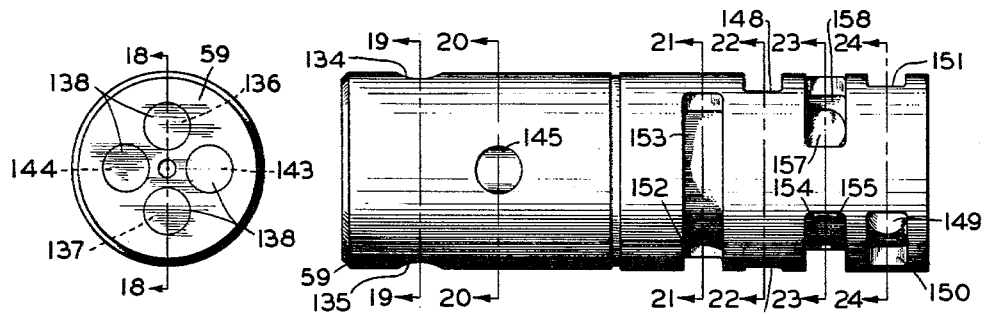
Fig-17  Fig-16
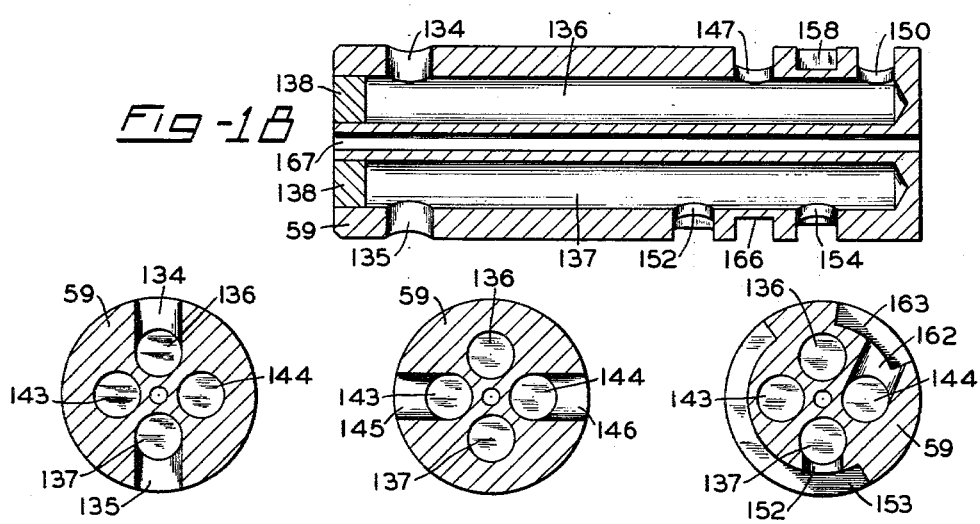
Fig-18
Fig-19  Fig-20  Fig-21
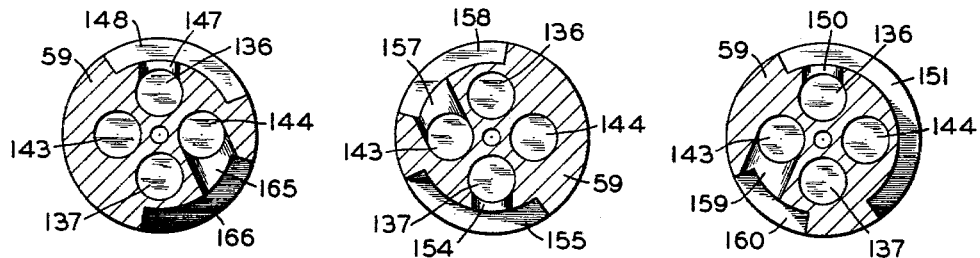
Fig-22  Fig-23  Fig-24
INVENTOR.
GLENN T. McCLURE
BY
A. A. Steinmiller
ATTORNEY July 6, 1965

G. T. McCLURE 3,193,191

ROTARY COMPRESSOR

Filed Oct. 27, 1961

INVENTOR.
GLENN T. McCLURE
BY
*A. A. Steinmiller*
ATTORNEY

July 6, 1965  G. T. McCLURE  3,193,191
ROTARY COMPRESSOR
Filed Oct. 27, 1961  12 Sheets-Sheet 12

INVENTOR.
GLENN T. McCLURE
BY
O. A. Steinmiller
ATTORNEY

////
United States Patent Office 3,193,191
Patented July 6, 1965

3,193,191
ROTARY COMPRESSOR
Glenn T. McClure, McKeesport, Pa., assignor to Westinghouse Air Brake Company, Wilmerding, Pa., a corporation of Pennsylvania
Filed Oct. 27, 1961, Ser. No. 148,273
5 Claims. (Cl. 230—158)

This invention relates to air compressors of the rotary vane type and more particularly to an air compressor of the rotary vane type having coaxial rotary vane members providing compressing chambers therebetween and functioning to compress air by varying relative speeds of the vane members.

In the operation of air compressors of the conventional piston type, some of the oil in the crankcase chamber that is splashed upon the cylinder walls for effecting lubrication of the reciprocating piston leaks past the piston rings into the air compressing chamber. This oil, due to the heat developed during the compression stroke, is vaporized and passes, in vapor form, with the compressed air from the compressing chamber to the air storage reservoir. In the air storage reservoir, some of the oil vapor may be condensed into liquid form due to cooling effect of the atmosphere and must be periodically drained from the reservoir. The oil vapor that is not thus condensed and removed from the storage reservoir passes from the reservoir entrained in the compressed air to the place of use. In many installations using compressed air, for example, food processing plants and railway air brake systems, the presence of oil vapor in the compressed air is very undesirable necessitating special devices for removing the entrained oil vapor.

Furthermore, in the operation of piston type air compressors, the heat developed by the compression of air tends to cause carbonization of any oil which may enter the discharge valve chamber resulting in formation of a carbon deposit on the walls of said chamber. This reduces dissipation of heat resulting in an even higher temperature in the chamber than otherwise would occur which tends to warp and crack the discharge valve and associated elements and render them at least inefficient in operation if not substantially unfit for service. Moreover, heat from the discharge valve chamber is transmitted to other parts of the cylinder head and the adjacent portion of the cylinder wall or walls which tends to burn oil and create carbon deposits thereon.

Conventional air compressors of the piston type are usually provided with metallic valves of either the poppet or disc type which valves are moved into and out of contact with corresponding metallic seats as air is drawn into and exhausted from one or more compressing chambers. Since these valves are moved into contact with their respective seats either by springs or by air pressure, the force thus exerted on the valves causes them to deliver a blow or an impact to their respective seats. These successive blows or impacts over a considerable period of time results in excessive wear of both the valves and their respective seats.

In addition, many conventional types of air compressors use crankshafts, connecting rods, pistons and piston rings, all of which require considerable and expensive machining in their manufacture and are also subject to wear when the compressor is operating.

Moreover, vibration occurs in most conventional multi-piston type air compressors as the result of the relative angular arrangement of the pistons, and this vibration must be eliminated, or at least reduced, by balancing of the moving parts of the compressor.

Finally, many of the conventional types of air compressors now in use are single acting, that is, air is compressed on only one side of a movable compressing element.

Accordingly, it is the general purpose of this invention to provide a novel, small, lightweight and inexpensive double-acting air-cooled air compressor of the rotary type in which no carbonization of oil can occur and no oil vapor can become entrained in the compressed air since no lubrication of the compressing elements is necessary and which requires a minimum of maintenance since no pistons, connecting rods, piston rings, movable metallic valves, and corresponding stationary valve seats are embodied in its structure.

According to the present invention, a novel air compressor is provided which comprises two rotary members, each having a number of radially extending equally spaced-apart blades or vanes, the vanes on one member being interjacently disposed with respect to the vanes on the other member to form a plurality of pairs of rotating compressing vanes. Each of the rotary members is separately driven by a corresponding non-circular gear, which gears are simultaneously cooperatively driven to effect a constant change of the angular velocity of each vane on one rotary member relative to an adjacent vane on the other rotary member, thereby effecting relative movement of each vane on one rotary member away from and toward an adjacent vane on the other rotary member to cause a compression of air. Air is drawn into, and after compression, is discharged from the compression chambers formed between adjacent vanes via ports and passages in one of the rotary members and in a cooperatively coaxial stationary pintle.

The construction of the novel air compressor is such as to provide improved balancing thereof with respect to air compressors of the conventional piston type as a result of so arranging the moving parts that the reactive forces resulting from the acceleration of these moving parts are substantially neutralized, thereby effecting a consequent reduction in vibration of the air compressor incident to the operation thereof. Furthermore, the construction of this novel air compressor is such that no contact occurs between adjacent vanes or between the vanes and a casing element, thereby eliminating the necessity of lubrication thereof.

In the accompanying drawings:
FIG. 1 is a side elevation view, in outline, of a two-stage air compressor embodying the invention.
FIG. 2 is a left-hand end view of the compressor as shown in FIG. 1.
FIG. 3 is a right-hand end view of the compressor as shown in FIG. 1 with the drive pulley, one bearing and a bearing housing therefor, and end cover removed to show how each stage of the air compressor is driven from a single drive shaft through a gear train.
FIG. 4 is a longitudinal sectional view, taken along the line 4—4 in FIG. 2, showing certain details of construction of the low pressure stage of the air compressor embodying the invention and how it is driven from the drive shaft.
FIG. 5 is a longitudinal sectional view, taken along the line 5—5 in FIG. 3, showing the relative arrangement of the high and low pressure stages of the air compressor embodying the invention and certain details of construction of each of the two stages.
FIG. 6 is a left-hand end view of the low pressure stage of the compressor shown in FIG. 4 with certain parts broken away to show certain details of construction of the cylinder and rotor of the low pressure stage of the air compressor together with a cooling fan for the low pressure cylinder and rotor.
FIG. 7 is a detail longitudinal elevational view of the pintle upon which the rotor of the low pressure stage of the air compressor is rotatably mounted.

FIG. 8 is a left-hand end view of the pintle shown in FIG. 7, showing the relative location of the parallel intake and discharge passageways in the pintle.

FIG. 9 is a sectional view, taken on the line 9—9 in FIG. 8, and showing one of the intake passageways and one of the discharge passageways in the pintle.

FIGS. 10, 11, 12, 13, 14 and 15 are cross-sectional views taken, respectively on the lines 10—10, 11—11, 12—12, 13—13, 14—14 and 15—15 in FIG. 7, and showing certain details of the pintle.

FIG. 16 is a detail longitudinal elevational view of the pintle upon which the rotor of the high pressure stage of the compressor is rotatably mounted.

FIG. 17 is a left-hand end view of the pintle shown in FIG. 16, showing the relative location of the parallel intake and discharge passageways in the pintle.

FIG. 18 is a sectional view, taken on the line 18—18 in FIG. 17, and showing the intake passageways in the pintle.

FIGS. 19, 20, 21, 22, 23 and 24 are cross-sectional views taken respectively on the lines 19—19, 20—20, 21—21, 22—22, 23—23, and 24—24 in FIG. 16, and showing certain details of the pintle.

Figure 5:
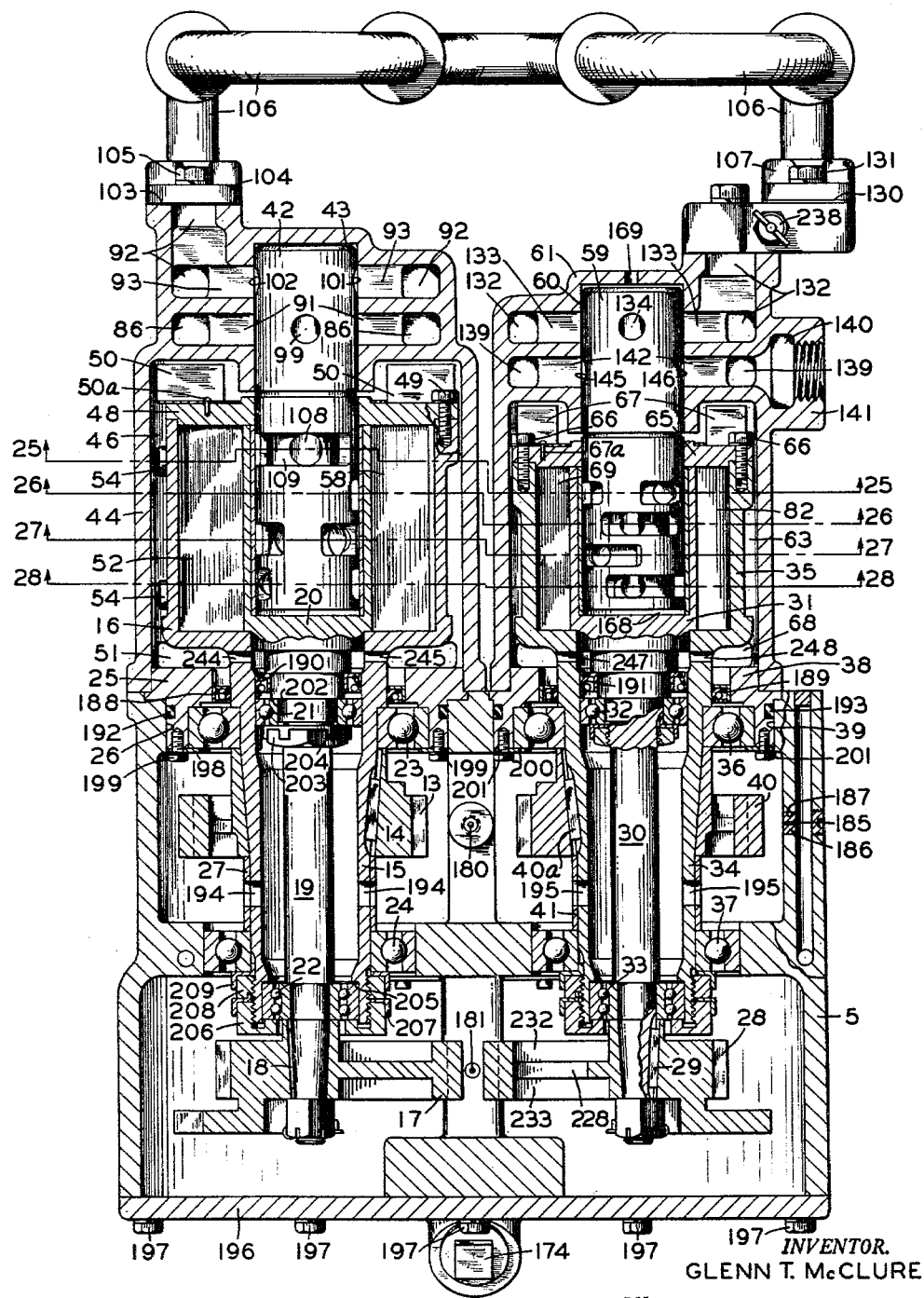

FIGS. 25, 26, 27 and 28 are partial vertical cross-sectional views of the air compressor, taken respectively along the lines 25—25, 26—26, 27—27, and 28—28 in FIG. 5, and showing the assembled relation of the pintle, the rotor, with the several inlet and discharge ports therein, the cylinder, and the casing for the different compressing chambers of each stage of the two-stage air compressor embodying the invention.

Figure 29:
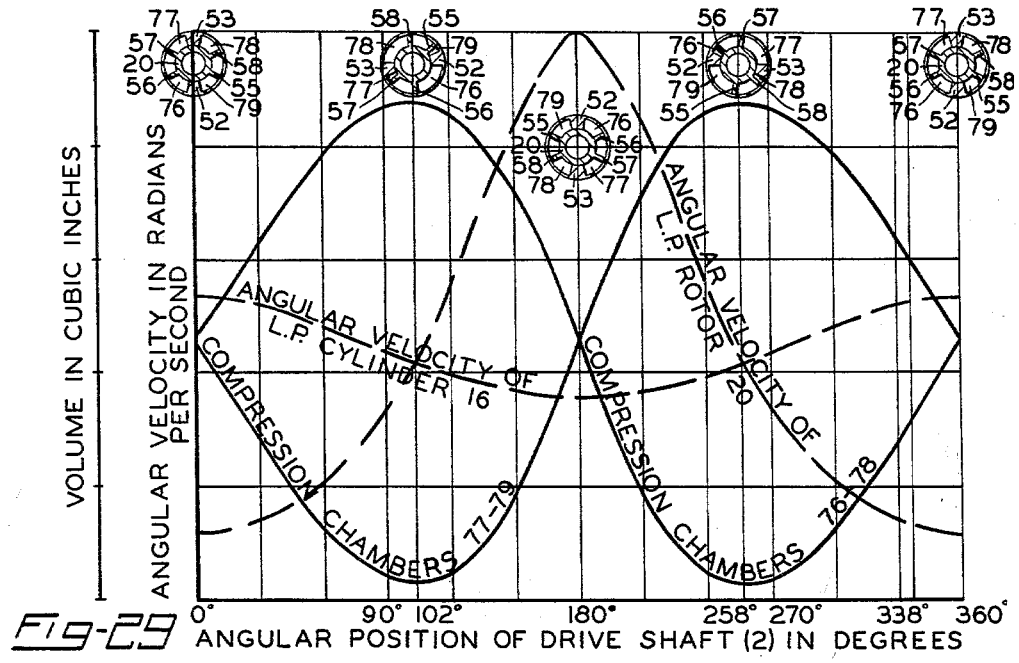

FIG. 29 is a typical graph, illustrative only (and not to be considered as limiting the scope of the invention mathematically, in any way) showing, for the low pressure stage of the air compressor embodying the invention, (1) the volume of the several compressing chambers in the compressor, (2) the angular velocity of the rotor, and (3) the angular velocity of the cylinder, for the different angular positions of the driving shaft.

Figure 30:
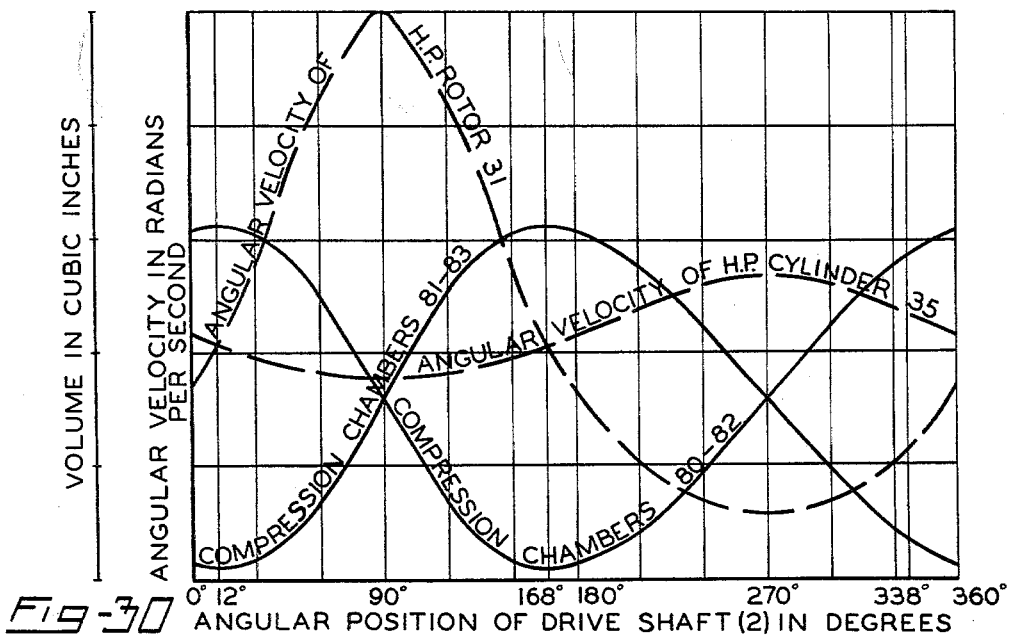

FIG. 30 is a typical graph, illustrative only (and not to be considered as limiting the scope of the invention mathematically, in any way) showing, for the high pressure stage of the air compressor embodying the invention, (1) the volume of the several compressing chambers in the compressor, (2) the angular velocity of the rotor, and (3) the angular velocity of the cylinder, for the different angular positions of the driving shaft.

*Description*

Figure 1:
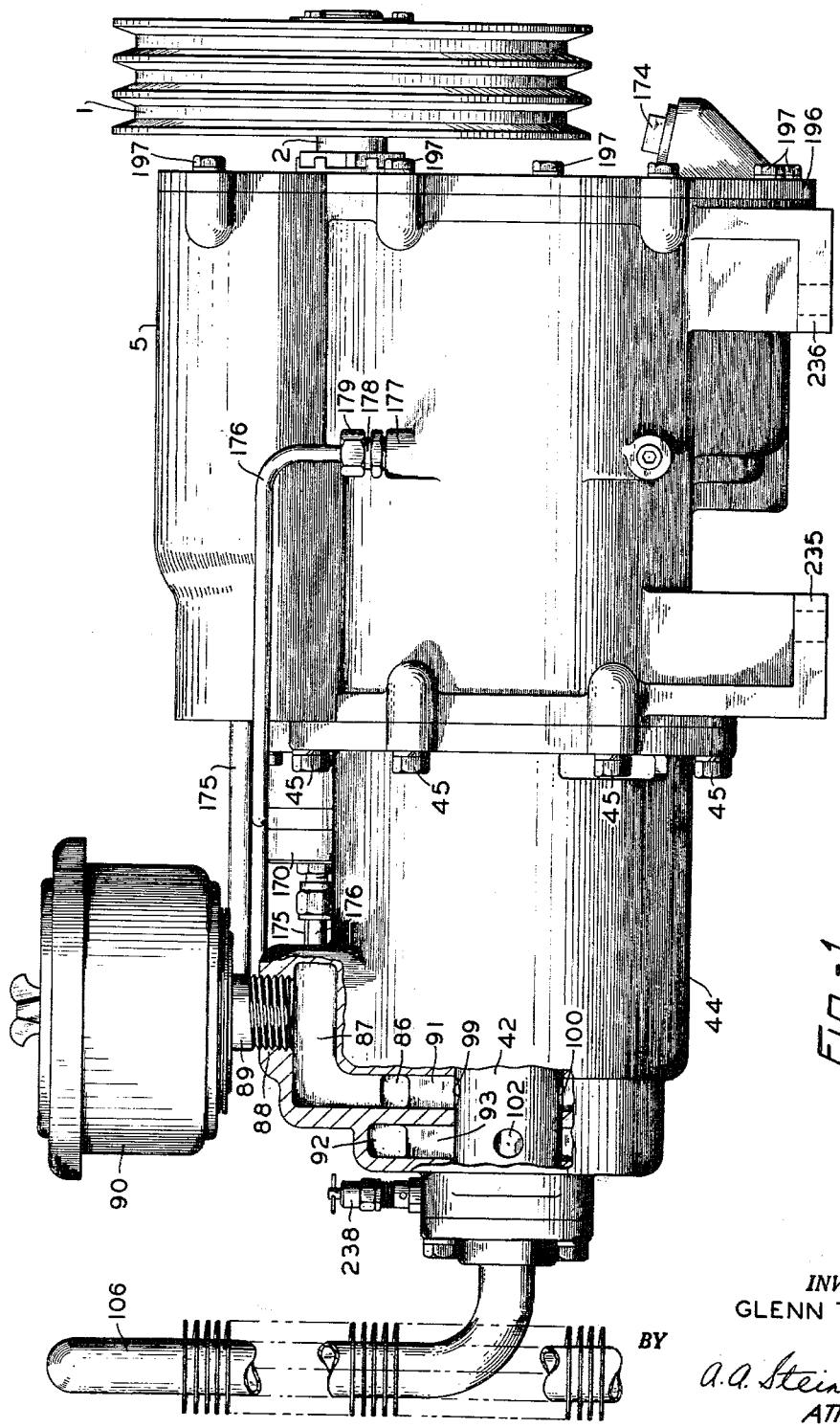
Figure 2:
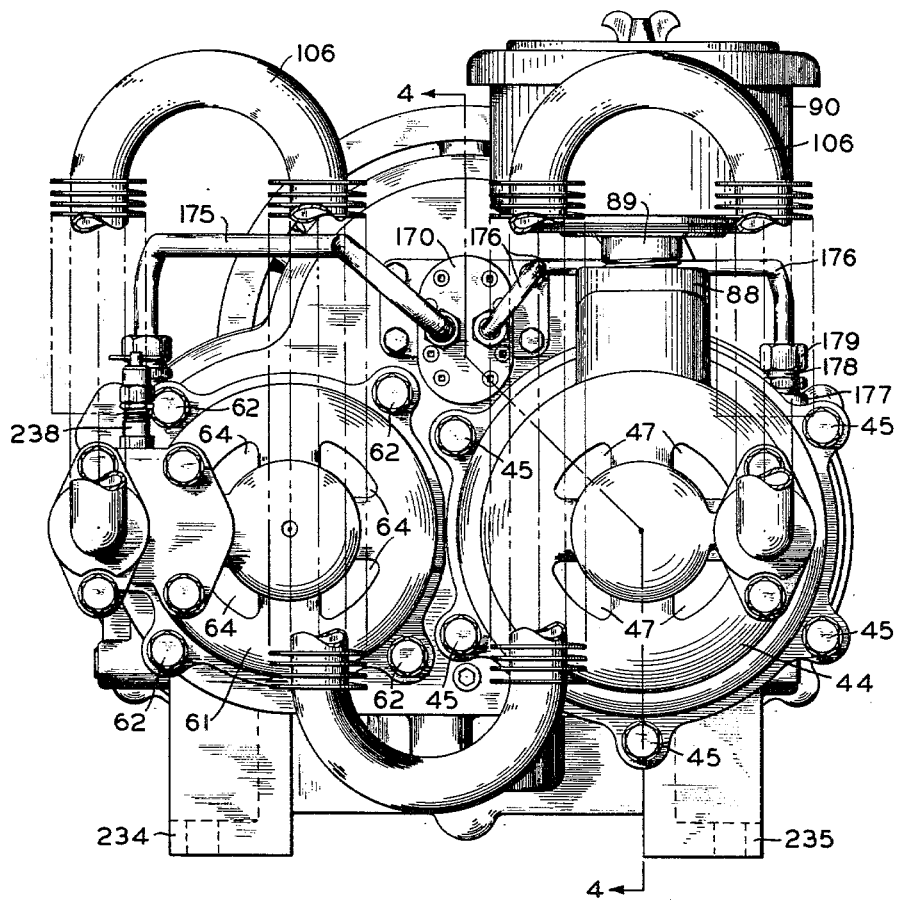
Figure 3:
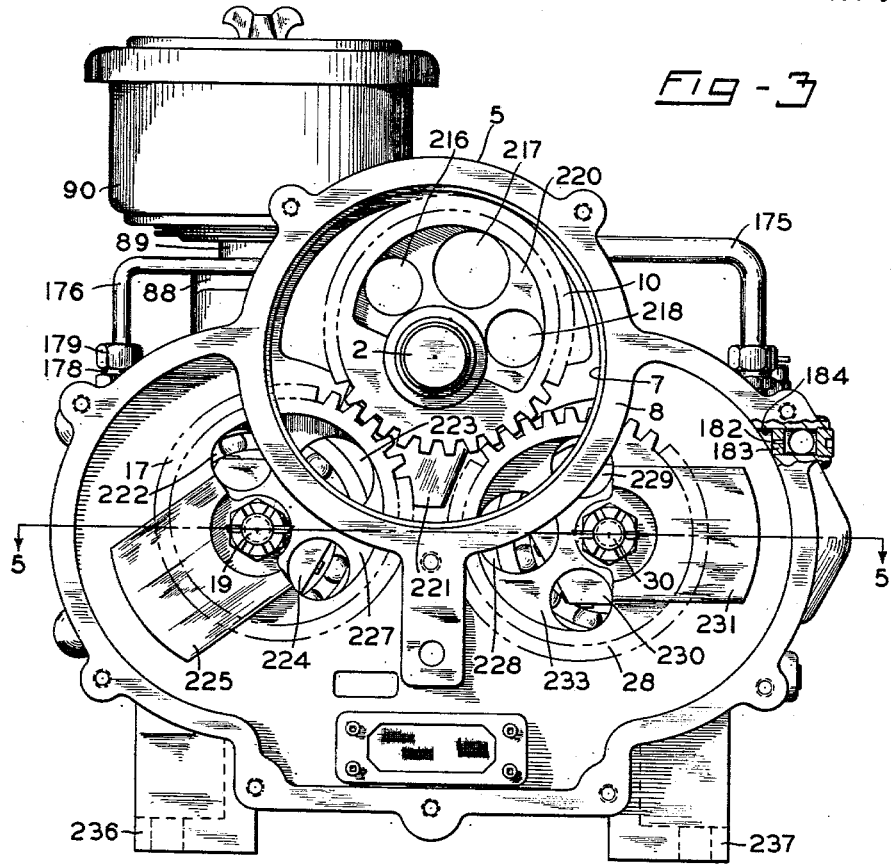
Figure 6:
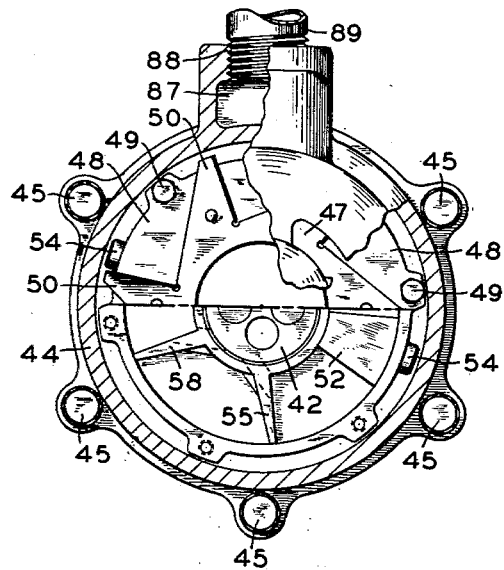
Figure 4:
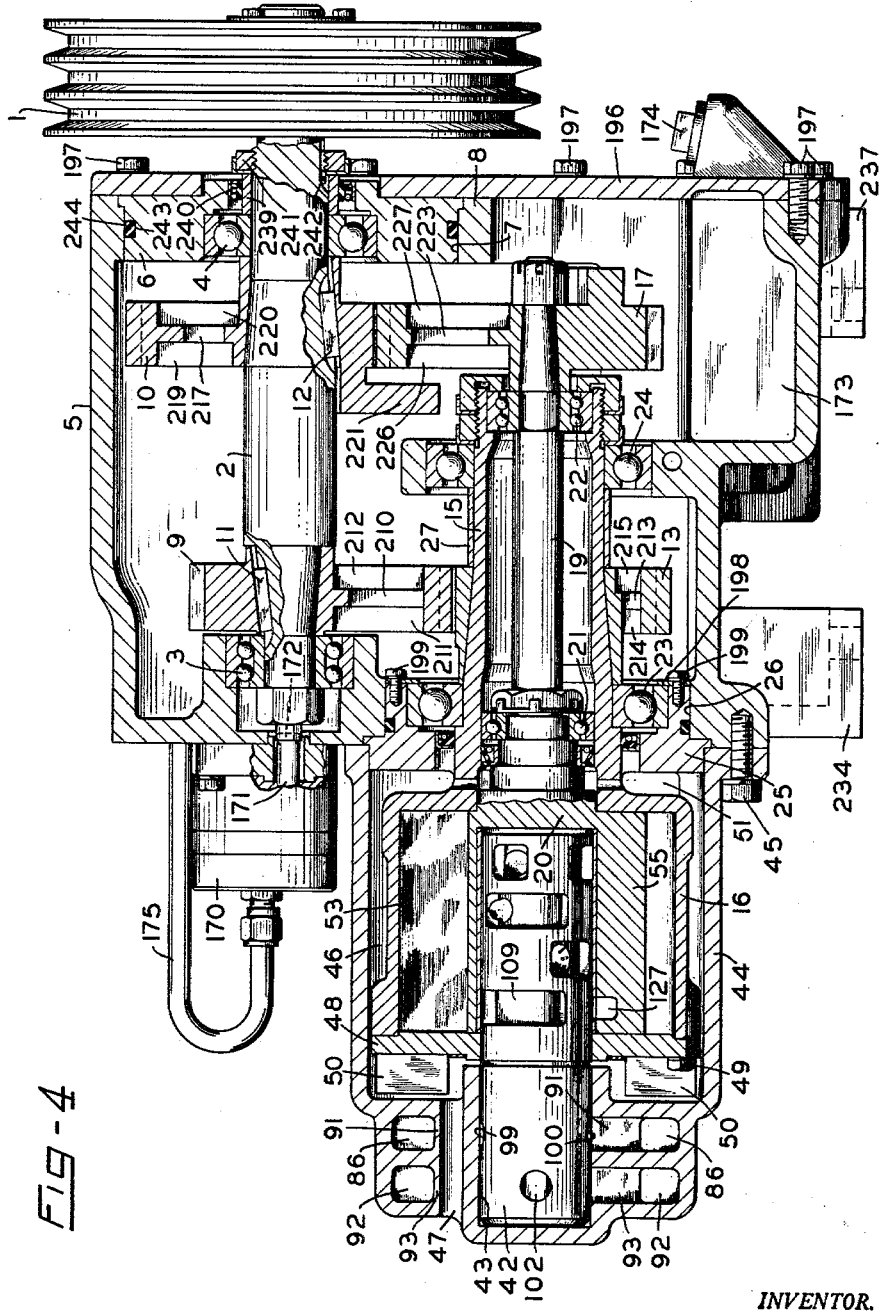

Referring to FIGS. 1, 2, 3 and 4 of the drawings, the two-stage air compressor shown therein comprises a drive pulley 1 which is keyed or otherwise secured to one end of a drive shaft 2 which is rotatably mounted in two ball bearings 3 and 4 (FIG. 4) which bearings are carried respectively in a casing 5 and in a cylindrical bearing housing 6 that is disposed in a bore 7 provided in a yoke 8 that is formed integral with the right-hand end of the casing 5 as shown in FIG. 4. A pair of non-circular gears 9 and 10 are keyed respectively by keys 11 and 12, in spaced-apart relation and inboard of the bearings 3 and 4, on the drive shaft 2. Non-circular gears 9 and 10 are illustratively shown as of elliptical type, each gear being mounted to rotate on an axis which passes through one of the foci thereof. As shown in FIGS. 3 and 4, the axis of rotation of the gears 9 and 10 is the common axis of rotation of drive shaft 2. The non-circular gear 9 meshes, as shown in FIG. 4, with a non-circular gear 13 which is keyed by a key 14, as shown in FIG. 5, to a hollow shaft 15 that extends from the lower end of a rotatable cylinder 16 of the low pressure stage of the air compressor. The non-circular gear 10, as also clearly shown in FIG. 4, meshes with another non-circular gear 17 which is keyed by a key 18, as shown in FIG. 5, to one end of a solid shaft 19, the other end of which is formed integral with the lower end of a rotor 20 of the low pressure stage of the compressor. The non-circular gears 13 and 17 are also illustratively shown as of the elliptical type and the axis of rotation thereof coincides respectively with the common axis of rotation of the low pressure stage cylinder 16 and low pressure stage rotor 20 which also passes through an opposite foci of each gear. The solid shaft 19 is rotatably carried by ball bearings 21 and 22 which are mounted in spaced-apart relation within the hollow shaft 15. The hollow shaft 15, in turn, is mounted in spaced-apart ball bearings 23 and 24 which are carried respectively in a cylindrical end member 25 that is disposed in a bore 26 formed in the left-hand end of the casing 5, as shown in FIG. 4, and in the casing 5. Between the non-circular gear 13 and the bearing 24 and mounted on the hollow shaft 15 is a spacer sleeve 27 which serves to maintain the non-circular gear 13 against movement along shaft 15.

As shown in FIG. 3, the non-circular gear 10, in addition to meshing with the non-circular gear 17, also meshes with a non-circular gear 28. As shown in FIG. 5, the non-circular gear 28 is keyed by a key 29 to one end of a solid shaft 30. The other end of the solid shaft 30 is integral with a rotor 31 of the high pressure stage of the compressor and is mounted in ball bearings 32 and 33 which, in turn, are mounted in spaced-apart relationship within a hollow shaft 34 which extends from and is integral with the lower end of a cylinder 35 of the high pressure stage of the compressor. The hollow shaft 34, in turn, is mounted in spaced-apart ball bearings 36 and 37. The bearing 36 is carried within an end member 38 that is disposed in a bore 39 in the right-hand upper open end of the casing 5. The bearing 37 is carried within the casing 5. Between the bearings 36 and 37 and mounted on the shaft 34 are respectively a non-circular gear 40 and a spacer sleeve 41. The non-circular gear 40 is keyed to the shaft 34 by a key 40a shown in FIG. 5 and meshes with the non-circular gear 9 shown in FIG. 4.

The non-circular gears 40 and 28 are also illustratively shown as of the elliptical type and the axis of rotation thereof coincides respectively with the common axis of rotation of the high pressure stage cylinder 35 and high pressure stage rotor 31 which also passes through an opposite foci of each gear.

From the above, it should be apparent that the gear 9 drives the gears 13 and 40 and the gear 10 drives the gears 17 and 28.

Considering first the low pressure stage of the compressor and referring to FIG. 4, it will be seen that the low pressure rotor 20 is rotatably mounted on a low pressure stage pintle 42 which has its left-hand end press-fitted into a counterbore 43 formed in a low pressure stage housing 44 that surrounds the rotatable cylinder 16 and is secured to the casing 5 by a plurality of cap screws 45 which are shown in FIG. 2, only one of which appears in FIG. 4. The rotatable cylinder 16 within the housing 44 cooperates therewith and with the the end member 25 to form a chamber 46, which chamber is open to atmosphere through a plurality of air inlet passageways 47 formed in the end of the housing 44, which passageways appear in FIG. 2. The upper open end of the low pressure stage cylinder 16, as viewed in FIG. 5, is provided with an end member 48 secured thereto by a plurality of cap screws 49, one of which is shown in FIG. 5. A plurality of radially arranged blades 50 are secured, as by rivets 50a, to the end member 48. These blades 50 constitute a fan for circulating air from the atmosphere via passageways 47 and chamber 46 to an outlet duct 51 (FIG. 5) in housing 44 whereby this circulation of air over the outside of the cylinder 16 effects cooling thereof.

Referring to FIGS. 25, 26, 27 and 28, it will be seen that the cylinder 16 of the low pressure stage of the air compressor has disposed therein two oppositely extending longitudinal blades 52 and 53 arranged 180° apart and each secured to the cylinder 13 by two cap screws 54 which, for blade 52, are shown in FIG. 5. Consequently, these blades rotate with the cylinder 16. The rotor 20 of the low pressure stage is likewise provided with four radially extending vanes 55, 56, 57, and 58, the vanes 56 and 57 being arranged between and to one side of a plane through the blades 52 and 53 of the cylinder 16 and the vanes 55 and 58 being between and to the opposite side of this plane through the blades 52 and 53.

Considering next the high pressure stage of the compressor and referring to FIG. 5, it will be seen that the high pressure stage rotor 31 is rotatably mounted on a high pressure stage pintle 59 which has its upper end press-fitted into a counterbore 60 formed in a second housing 61 that is secured to the casing 5 by a plurality of cap screws 62 which are shown in FIG. 2. The high pressure stage rotatable cylinder 35 within the second housing 61 cooperates therewith and with the end member 38 to form a chamber 63, which chamber is open to atmosphere through a plurality of radially arranged air inlet passageways 64 formed in the outer end of the second housing 61, which passageways 64 appear in FIG. 2. The high pressure stage cylinder 35 is provided with an end member 65 which is secured to the cylinder by a plurality of radially arranged cap screws 66, two of which appear in FIG. 5. A plurality of blades 67 are secured to the end member 65 as by rivets 67a. These blades 67 constitute a fan for circulating air from the atmosphere via passageways 64 and chamber 63 to an outlet duct 68 provided in the second housing 61 whereby this circulation of air over the outside of the high pressure stage cylinder 35 effects cooling thereof.

As can also be seen from FIGS. 5, 25, 26, 27 and 28, the cylinder 35 of the high pressure stage of the compressor is provided with two oppositely extending longitudinal blades 69 and 70 arranged 180° apart and each secured to the cylinder 35 by two cap screws 71. Consequently, these blades rotate with the cylinder 35. The rotor 31 of the high pressure stage is likewise provided with four radially extending vanes 72, 73, 74 and 75, the vanes 73 and 74 being arranged between and to one side of a plane through the blades 69 and 70 of the cylinder 35 and the vanes 72 and 75 being arranged between and to the opposite side of this plane through the blades 69 and 70.

The vanes of each rotor and the blades of each cylinder in cooperation with the respective rotor and cylinder form four compressing chambers for each stage of the air compressor. In the case of the low pressure stage of the compressor, the blade 52 of the low pressure stage cylinder 16 and the vane 56 of the low pressure rotor 20 cooperate to form therebetween a first compression chamber 76. Likewise, the vane 57 and the blade 53 cooperate to form therebetween a second compression chamber 77, the blade 53 and the vane 58 cooperate to form therebetween a third compression chamber 78, and the vane 55 and the blade 52 cooperate to form therebetween a fourth compression chamber 79.

In the high pressure stage of the compressor, the blade 69 of the cylinder 35 and the vane 73 of the rotor 31 cooperate to form therebetween a first compression chamber 80. Likewise, the vane 74 and the blade 70 cooperate to form therebetween a second compression chamber 81, the blade 70 and the vane 75 cooperate to form therebetween a third compression chamber 82, and the vane 72 and the blade 69 cooperate to form therebetween a fourth compressing chamber 83.

Considering again the low pressure stage of the compressor, it will be seen from FIGS. 25, 26, 27 and 28 that the low pressure stage rotor 20 is provided with a bore 84 extending therethrough into which is press-fitted a bushing 85 that has a turning or running fit with the low pressure stage pintle 42. The interior of the bushing 85 is coated with a suitable material which is effective, when the bushing 85 rotates with the rotor 20 on the low pressure pintle 42, to reduce to a minimum leakage of fluid under pressure between the pintle 42 and the bushing 85.

As shown in FIGS. 1, 4 and 5, the housing 44 of the low pressure stage of the air compressor is provided with an inlet passageway 86 which extends circumferentially around the low pressure stage pintle 42 and leads by an offset passageway 87, shown in FIG. 1, to a threaded boss 88 formed on the housing 44 into which threaded boss 88 is received in screw-threaded engagement one end of a nipple 89, the opposite end of which is connected to an atmospheric air intake filter 90. Disposed in the inlet passage 86 and arranged radially around the low pressure pintle 42 are a plurality of webs 91 which are cast integral with the housing 44 and through which the passageways 47 extend, one of which passageways 47 is shown in FIG. 4.

Arranged in spaced-apart parallel relation to the inlet passageway 86 in the housing 44 is a discharge passageway 92 which also extends circumferentially around the low pressure stage pintle 42. Disposed in the discharge passageway 92 and arranged radially around the low pressure pintle 42 are a plurality of webs 93 which are cast integral with the housing 44 and through which the passageways 47 also extend, as is evident in FIG. 4.

The details of the low pressure stage pintle 42 are shown in FIGS. 7 to 15, inclusive, of the drawings. By referring to FIGS. 8 and 10 to 15 inclusive, it will be seen that the pintle 42 has arranged therein parallel to its axis and disposed thereabout four longitudinal passageways 94, 95, 96 and 97. Passageways 94 and 96 are intake passageways and are open at each end of the pintle 42. Passageways 95 and 97 are discharge passageways and are closed at each end by being in the form of a bottomed bore having the respective open ends closed by a plug 98 press-fitted thereinto. It will be seen from FIG. 11 that the intake passageways 94 and 96 are open respectively through first and second ports 99 and 100 located 180° apart to the periphery of the low pressure pintle 42. The inlet passageway 86 in the housing 44 extends around the pintle 42 at the same location from the left-hand end of the pintle 42 as the ports 99 and 100 are located from this end (see FIG. 5). It is evident then that an inlet communication is established from the atmosphere through the air intake filter 90, nipple 89, passageways 87 and 86, and the ports 99 and 100 (FIG. 1) to the respective intake passageways 94 and 96.

It will be seen from FIG. 10 that the discharge passageways 97 and 95 are open respectively by a third port 101 and a fourth port 102 to the periphery of the pintle 42. The discharge passageway 92 in the housing 44 (see FIG. 5) extends around the low pressure stage pintle 42 at the same location from the upper end of the pintle as the ports 101 and 102 are located from this end. It is evident then that the pintle discharge passageways 97 and 95 are open respectively through the ports 101 and 102 to the periphery of the pintle 42, thence to the discharge passageway 92 which, as shown in FIG. 5, extends upward to a face 103 formed on the housing 44 of the low pressure stage of the compressor. A flange fitting 104 is bolted to the face 103 by a pair of cap screws 105, only one of which appears in FIG. 5. The flange fitting 104 receives one end of a finned tube 106 which constitutes an intercooler between the low pressure stage and the high pressure stage of the compressor. This finned tube 106 extends from the flange fitting 104 which is secured to the low pressure housing 44 to a flange fitting 107 which is secured to the housing 61 of the high pressure stage of the compressor which will be hereinafter described in detail.

Figure 25:
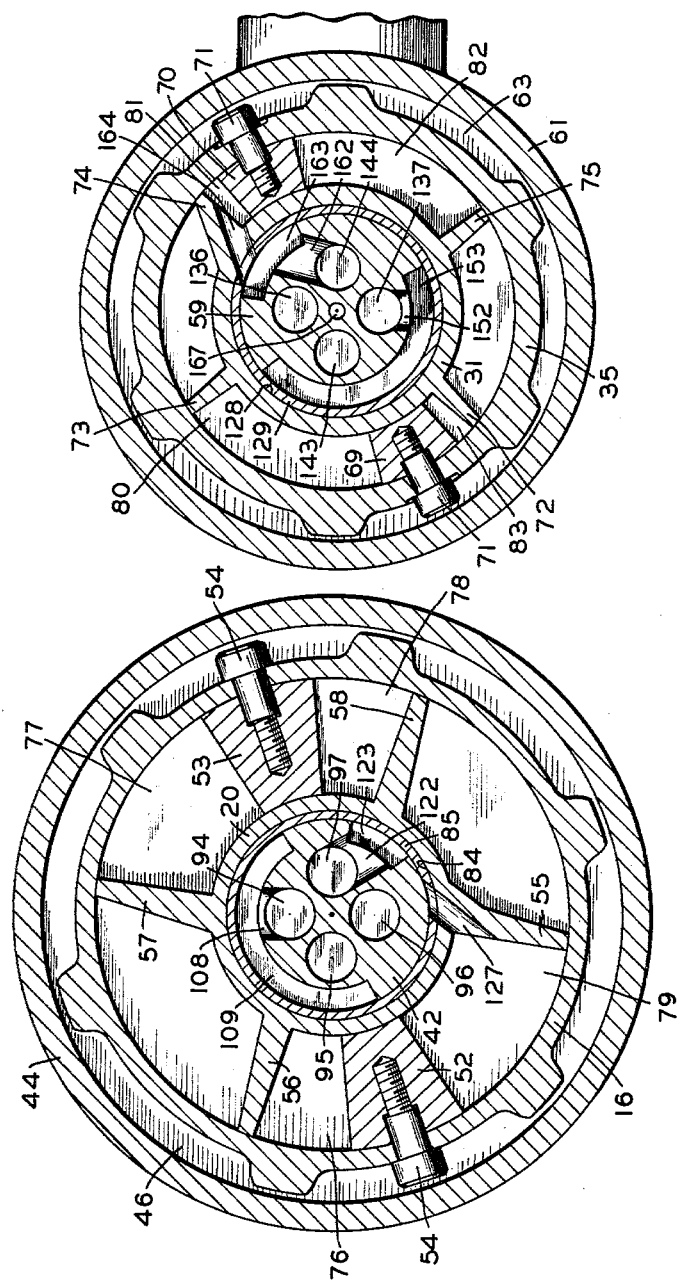
Figure 26:
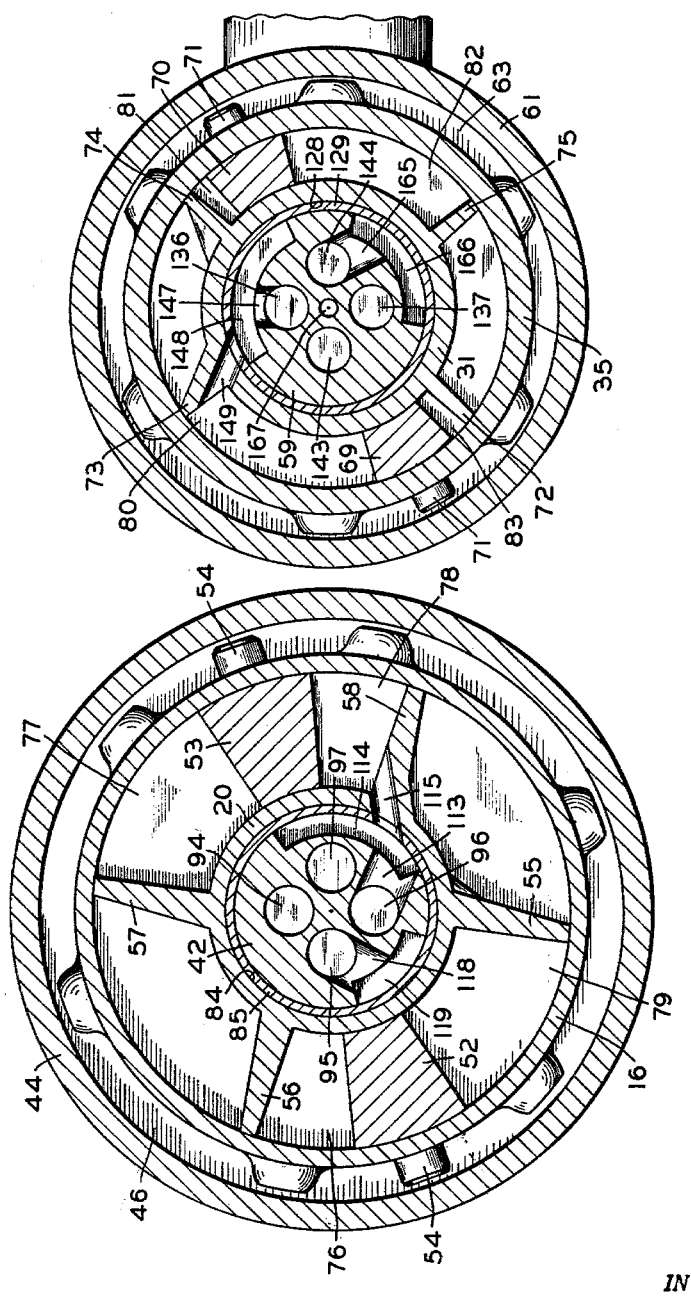
Figure 27:
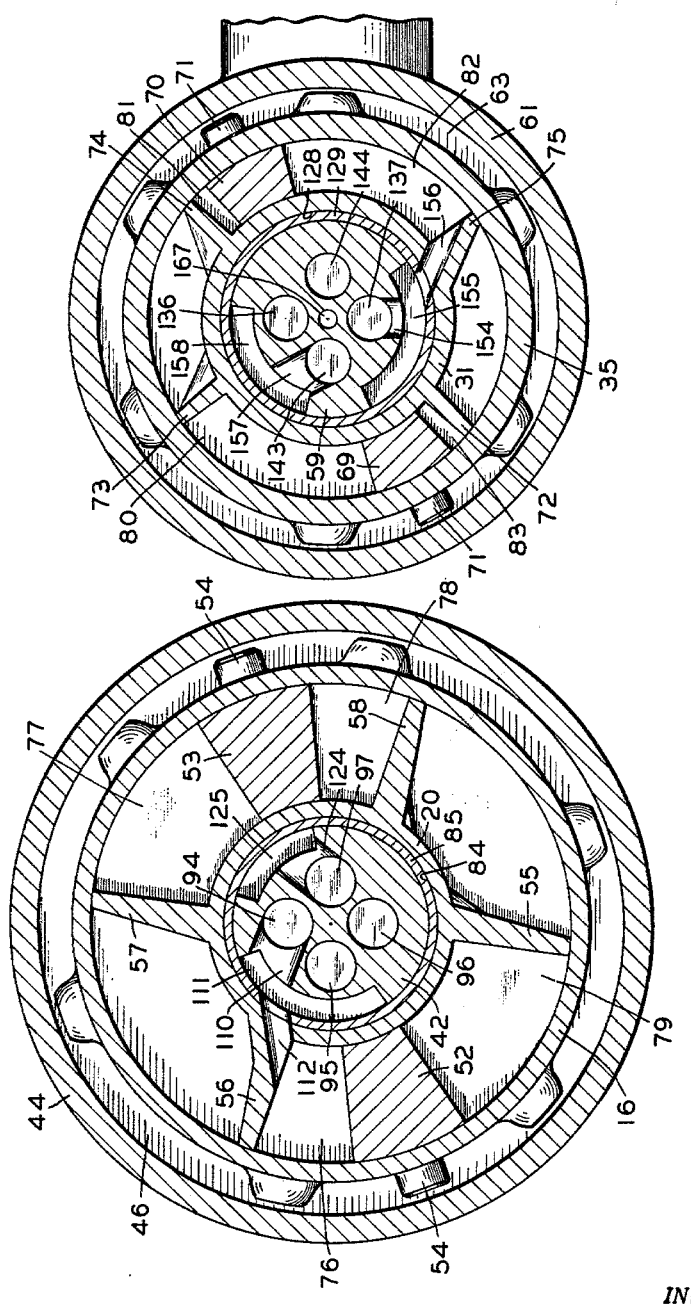
Figure 28:
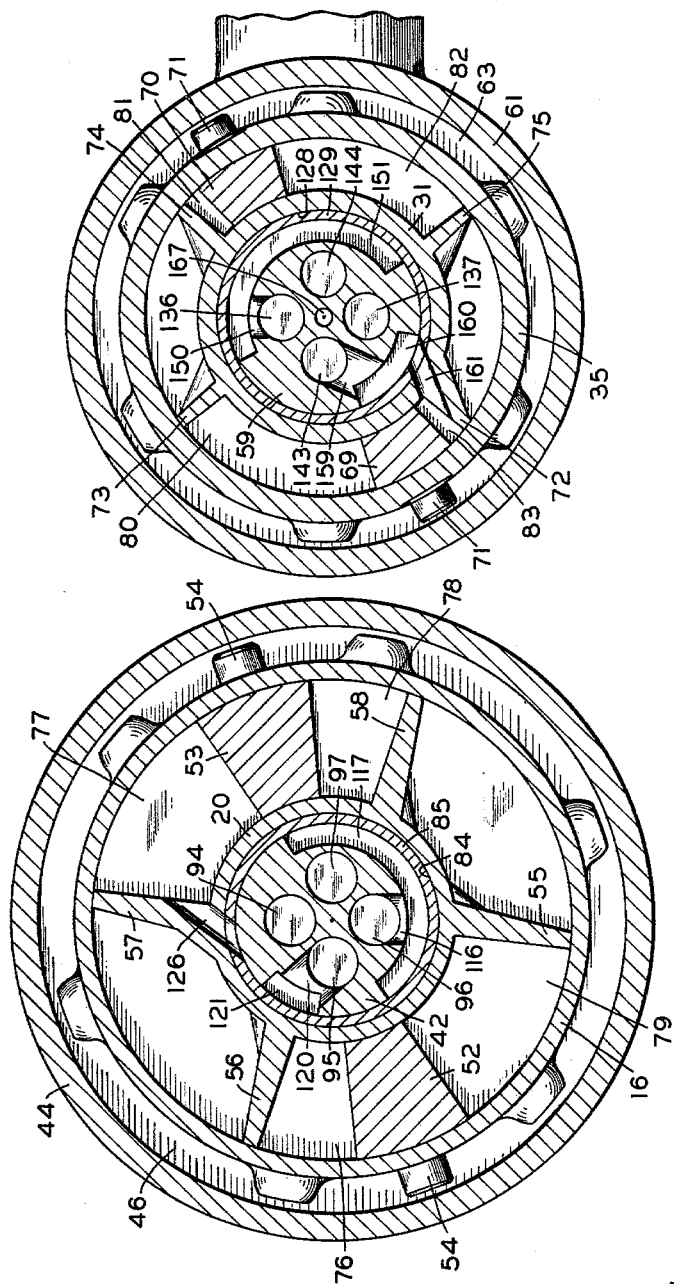

As shown in FIGS. 12 and 25, there is formed in the low pressure stage pintle 42 a fifth port 108 which connects the intake passageway 94 within the pintle 42 to a first groove 109 formed on a portion of the periphery of the pintle 42. As shown in FIG. 25, the bushing 85 which rotates with the low pressure stage rotor 20 cuts off flow from the first pintle groove 109 to the compression chambers 76 and 77 of the low pressure stage of the compressor. As shown in FIGS. 14 and 27 of the drawings, the intake passageway 94 is also connected by a fourth port 110 to a second groove 111 formed on a portion of the periphery of the pintle 42. When the low pressure rotor 20 and low pressure cylinder 16 occupy the respective positions in which they are shown in FIG. 27, which are the same as those in which they are shown in FIGS. 25, 26 and 28, a passageway 112 that extends through the bushing 85 and the vane 56 of the rotor 20 established a communication from the intake passageway 94 via port 110 and the groove 111, to the low pressure stage compression chamber 76 of the low pressure stage of the compressor. Consequently, when the low pressure stage cylinder 16 and the low pressure stage rotor 20 occupy the respective positions in which they are shown in FIG. 27, air will flow from atmosphere through the inlet filter 90 (see FIG. 1), nipple 89, offset passageway 87, inlet passageway 86, port 99 (see FIG. 11), intake passageway 94, port 110 (FIGS. 14 and 27), pintle groove 111, and passageway 112 in vane 56 of the low pressure stage rotor 20 to the compression chamber 76 of the low pressure stage of the compressor so that the compression chamber 76 will be filled with air at atmospheric pressure.

It will be seen from FIGS. 13 and 26 that, at this time, the second intake passageway 96 is connected by a seventh port 113 to a third groove 114 that extends around a portion of the periphery of the low pressure stage pintle 42. When the low pressure stage cylinder 16 and the low pressure stage rotor 20 occupy the positions in which they are respectively shown in FIG. 26, which, as hereinbefore stated, is the same as that in which they are shown in FIG. 27, the groove 114 in the pintle 42 is connected by a passageway 115 extending through the bushing 85 and the vane 58 of the rotor 20 to the compression chamber 78 of the low pressure stage of the compressor. Consequently, air will flow from atmosphere through the inlet filter 90, nipple 89, offset passageway 87, inlet passageway 86 (see FIG 1), port 100 (see FIG. 11), intake passageway 96, port 113 (FIGS. 13 and 26), pintle groove 114 and passageway 115 to the compression chamber 78 of the low pressure stage of the compressor so that the compression chamber 78 also will be filled with air at atmospheric pressure.

Furthermore, it will be seen from FIGS. 15 and 28 that, at this time, the intake passageway 96 is also connected by an eighth port 116 to a fourth groove 117 that extends around a portion of the periphery of the low pressure stage pintle 42. When the low pressure stage cylinder 16 and the low pressure stage rotor 20 occupy the positions in which they are respectively shown in FIG. 28, the bushing 85 which is carried by the low pressure stage rotor 20 cuts off flow from the pintle groove 117 to the low pressure stage compression chambers 78, and 79.

As shown in FIGS. 13 and 26, the discharge passageway 95 is connected by a ninth port 118 to a fifth groove 119 formed on a portion of the periphery of the low pressure stage pintle 42. As shown in FIGS. 15 and 28, the discharge passageway 95 is also connected by a tenth port 120 to a sixth groove 121 formed on a portion of the periphery of the low pressure stage pintle 42. As shown in FIGS. 26 and 28, the bushing 85 which rotates with the low pressure stage rotor 20 cuts off flow respectively from the pintle groove 119 (FIG. 26) and the pintle groove 121 (FIG. 28) to the compression chamber 79 and to the compression chamber 76 of the low pressure stage of the compressor.

As shown in FIGS. 12 and 25, the discharge passageway 97 is connected by an eleventh port 122 to a seventh groove 123 formed on a portion of the periphery of the low pressure stage pintle 42. When the low pressure stage cylinder 16 and the low pressure stage rotor 20 occupy the position in which they are shown in FIG. 25, the bushing 85 which rotates with the low pressure stage rotor 20 cuts off flow from the groove 123 in the periphery of low pressure stage pintle 42 to the compression chamber 78 of the low pressure stage of the compressor. As shown in FIGS. 14 and 27, the discharge passageway 97 also is connected by a twelfth port 124 to an eighth groove 125 formed on the portion of the periphery of the low pressure stage pintle 42. As shown in FIG. 27, the bushing 85 which rotates with the low pressure stage rotor 20 cuts off flow from the pintle groove 125 to the compressor chamber 77 of the low pressure stage of the compressor. Consequently, when the low pressure stage rotor 20 and the low pressure stage cylinder 16 occupy the positions in which they are respectively shown in the drawings, no flow of air under pressure can occur from a compression chamber of the low pressure stage of the compressor to the discharge passageway 97 in the low pressure stage pintle 42.

In addition to the passageway 112 extending through the bushing 85 and the vane 56 of the low pressure stage rotor 20 (see FIG. 27), and the passageway 115 extending through the bushing 85 and the vane 58 of the low pressure stage rotor 20 (see FIG. 26), a passageway 126 extends through the bushing 85 and the vane 57 of the low pressure stage rotor 20, as shown in FIG. 28, and opens into the compression chamber 77 of the low pressure stage of the compressor. Also, as shown in FIG. 25, a passageway 127 extends through the bushing 85 and the vane 55 of the low pressure stage rotor 20. The purpose of these passageways will hereinafter be made apparent. However, when the low pressure stage rotor 20 occupies the position shown in the drawings, no flow of air can occur from the respective chambers 77 and 79 so that the air therein is trapped since the inner ends of the respective passageways 126 (FIG. 28) and 127 (FIG. 25) are blanked or lapped by the pintle 42. However, in certain other angular positions of the low pressure stage rotor 20, the passageways 126 and 127 establish flow from the intake passageways in the pintle to certain of the compression chambers and in still other positions of the rotor 20 establish flow from certain of the compression chambers to a certain one of the discharge passageways in the pintle 42.

Considering now the high pressure stage of the compressor, it will be understood that the high pressure stage is identical in construction to the low pressure stage except that the parts of the high pressure stage are proportionately smaller due to the fact that the volume of the air leaving the low pressure stage of the compressor is less than the volume of atmospheric air entering the low pressure stage as a result of the compression of this air in the low pressure stage of the compressor. Accordingly, it will be seen from FIGS. 25, 26, 27 and 28 that the high pressure stage rotor 31 is provided with a bore 128 extending therethrough into which is press-fitted a bushing 129 that has a turning or running fit with the high pressure stage pintle 59. The interior of the bushing 129 is coated with a suitable material which is effective when the bushing 129 rotates with the high pressure stage rotor 31 on the high pressure stage pintle 59 to reduce to a minimum leakage of air between the pintle and the bushing as is the case with the bushing 85 of the low pressure stage rotor 20 of the compressor.

Referring to FIG. 5, it will be seen that the flange fitting 107 located at the high pressure stage end of the finned tube 106, which constitutes the intercooler between the low pressure stage and the high pressure stage of the compressor, is bolted to a face 130 formed on the housing 61 of the high pressure stage of the compressor by a pair of cap screws 131 only one of which appears in FIG. 5. Air under pressure that is discharged from the low pressure stage of the compressor flows through the finned tube 106, where it is cooled, to an inlet passageway 132 in the high pressure stage housing 61, which inlet passageway 132 extends circumferentially around the high pressure stage pintle 59. Disposed in the inlet passageway 132 and arranged radially around the high pressure stage pintle 59 are a plurality of webs 133 which are cast integral with the housing 61. These webs 133 correspond substantially to the webs 91 in the low pressure stage housing 44. Referring to FIGS. 5, 16 and 19, it will be understood that the high pressure inlet passageway 132 extends around the high pressure pintle 59 at the same location from the upper end of the pintle 59, as viewed in FIG. 5, as a first port 134, shown in FIGS. 5, 16, and 19, and a second port 135, shown only in FIGS. 16 and 19. It will be seen from FIG. 19 that the ports 134 and 135 are located 180° apart around the periphery of the pintle 59 and extend inwardly from the periphery respectively to two parallel intake passageways 136 and 137 that extend longitudinally through the pintle 59 parallel to the axis thereof. These intake passageways 136 and 137 are arranged 180° apart as are the corresponding intake passageways 94 and 96 in the low pressure stage pintle 42. Consequently, it is evident then that, as shown in FIG. 5, a high pressure stage inlet communication is established from the finned tube 106, which constitutes the intercooler between the two stages of the compressor via high pressure stage inlet passageway 132 and ports 134 and 135 to the respective intake passageways 136 and 137.

The intake passageways 136 and 137 in the high pressure pintle 59 are closed at each end, as shown in FIG. 18, by being in the form of a bottom bore having the respective open ends closed by a plug 138 press-fitted into the open end thereof.

As shown in FIG. 5, arranged in spaced-apart parallel relation to the high pressure stage inlet passageway 132 formed in the housing 61 is a high pressure outlet passageway 139 which also extends circumferentially around the high pressure pintle 59 and, as shown in FIG. 5, is open to a discharge chamber 140 from which the compressed air may flow through a pipe (not shown) to a storage reservoir (not shown), the pipe being screw-threaded into a threaded boss 141 that is formed integral with the housing 61 of the high pressure stage of the compressor. Disposed in the high pressure outlet passageway 139 and arranged radially around the high pressure pintle 59 are a plurality of spaced-apart webs 142 formed integral with the housing 61 of the high presssure stage of the compressor. The plurality of atmospheric air inlet passageways 64, shown in FIG. 2, extend through the respective webs 133 and 142 in order that air from the atmosphere may flow therethrough into the chamber 63 for circulation by the blades 67 secured to the high pressure end member 65 to provide for cooling of the high pressure cylinder 35.

The details of the high pressure pintle 59 are shown in FIGS. 17 to 24, inclusive, of the drawings, and by reference thereto, it will be seen that the pintle 59, in addition to being provided with inlet passageways 136 and 137, is also provided with two longitudinal discharge passageways 143 and 144. The discharge passageways 143 and 144 are closed at each end by being in the form of a bottomed bore having the respective open ends closed by plugs 138. The four passageways in the pintle 59 are parallel and arranged about the axis of the pintle 90° from each other. Furthermore, the two discharge passageways are arranged 180° apart and the two intake passageways are likewise arranged 180° apart. It will be seen from FIG. 20 that the discharge passageways 143 and 144 are open respectively through third and fourth ports 145 and 146 to the periphery of the high pressure pintle 59. The high pressure outlet passageway 139 in the housing 61 extends around the high pressure pintle 59 at the same location from the upper end of the pintle 59, as viewed in FIG. 5, as the ports 145 and 146 are located from this end of the pintle. Consequently, air that is further compressed in the high pressure stage of the compressor and supplied to the discharge passageways 143 and 144 in the high pressure stage pintle 59 flows therefrom through the respective ports 145 and 146 to the outlet passageway 139 extending around the pintle, thence to the chamber 140 and therefrom through the pipe secured to the boss 141 to the storage reservoir.

It will be seen from FIGS. 22 and 26 that there is formed in the high pressure stage pintle 59 a fifth port 147 which connects the intake passageway 136 within the high pressure pintle 59 to a first groove 148 formed on a portion of the periphery of the high pressure pintle 59. When the high pressure stage rotor 31 and the high pressure stage cylinder 35 occupy the positions in which they are respectively shown in FIG. 26, a passageway 149 that extends through the bushing 129 and the vane 73 of the high pressure stage rotor 31 establishes a communication from the intake passageway 136 via port 147 and groove 148 in the high pressure stage pintle 59 to the compression chamber 80 of the high pressure stage of the compressor. Accordingly, when the high pressure stage cylinder 35 and the high pressure stage rotor 31 occupy the positions in which they are respectively shown in FIG. 26, air under pressure will flow from the intercooler 106 through the high pressure inlet passageway 132 (see FIG. 5), port 134 (see FIG. 19), intake passageway 136 in the high pressure pintle 59, port 147 (see FIGS. 22 and 26), pintle groove 148 in the high pressure pintle 59 and passageway 149 in the vane 73 of the high pressure stage rotor 31 to the compression chamber 80 of the high pressure stage of the compressor so that the compression chamber 80 will be filled with air at the pressure to which it was compressed by the low pressure stage of the compressor and supplied to the intercooler 106.

As shown in FIGS. 24 and 28, the intake passageway 136 in the high pressure stage pintle 59 is also connected by a sixth port 150 to a second groove 151 formed on a portion of the periphery of the high pressure stage pintle 59. As shown in FIG. 28, the bushing 129 which rotates with the high pressure stage rotor 31 cuts off flow from the pintle groove 151 in the periphery of the high pressure stage pintle 59 to the compression chambers 81 and 82 of the high pressure stage of the compressor.

It will be seen from FIGS. 21 and 25 that, at this time, the intake passageway 137 in the high pressure stage pintle 59 is connected by a seventh port 152 to a third groove 153 that extends around a portion of the periphery of the high pressure stage pintle 59. When the high pressure stage cylinder 35 and the high pressure stage rotor 31 occupy the positions in which they are respectively shown in FIG. 25, the bushing 129 which rotates with the high pressure rotor 31 cuts off flow from the pintle groove 153 to the compression chamber 80 and the compression chamber 83 respectively of the high pressure stage of the compressor.

As shown in FIGS. 23 and 27, it will be seen that the intake passageway 137 in the high pressure stage pintle 59 is also connected by an eighth port 154 to a fourth groove 155 that extends around a portion of the periphery of the high pressure stage pintle 59. When the high pressure stage cylinder 35 and the high pressure stage rotor 31 occupy the positions in which they are respectively shown in FIG. 27, the groove 155 in the high pressure pintle 59 is connected by a passageway 156 extending through the bushing 129 and the vane 75 of the high pressure stage rotor 31 to the compression chamber 82 of the high pressure stage of the compressor. Consequently, air under pressure which has been supplied to the intercooler 106 by the low pressure stage of the compressor will flow therefrom through the high pressure inlet passageway 132 (FIG. 5), the port 135 (FIG. 19) in the high pressure stage pintle 59 to the intake passageway 137, thence from the passageway 137 through the port 154 (FIG. 23), pintle groove 155 in the pintle 59, and the passageway 156 (FIG. 27) in the vane 75 of the high pressure stage rotor 31 to the compression chamber 82 of the high pressure stage of the compressor so that the compression chamber 82 will be charged with air under pressure at the pressure to which it was compressed by the low pressure stage of the compressor.

As shown in FIGS. 23 and 27, the discharge passageway 143 in the high pressure pintle 59 is connected by a ninth port 157 to a fifth groove 158 formed on a portion of the periphery of the high pressure stage pintle 59. When the high pressure stage cylinder 35 and the high pressure stage rotor 31 occupy the positions in which they are respectively shown in FIG. 27, the bushing 129 which rotates with the high pressure rotor 31 cuts off flow from the pintle groove 158 to the compression chamber 80. As shown in FIGS. 24 and 28, the discharge passageway 143 in the high pressure stage pintle 59 is also connected by a tenth port 159 to a sixth groove 160 formed on a portion of the periphery of the high pressure stage pintle 59. When the high pressure stage cylinder 35 and the high pressure stage rotor 31 occupy the positions in which they are respectively shown in FIG. 28, the groove 160 in the high pressure stage pintle 59 is connected by a passageway 161 extending through the bushing 129 and the vane 72 of the high pressure stage rotor 31 to the compression chamber 83 of the high pressure stage of the compressor. Consequently, the compression chamber 83 is in communication with the discharge passageway 143 in the high pressure pintle 59 so that air being compressed in the chamber 83 may flow therefrom to the discharge passageway 143 and thence to the storage reservoir.

As shown in FIGS. 21 and 25, the discharge passageway 144 in the high pressure stage pintle 59 is connected by an eleventh port 162 to a seventh groove 163 formed on a portion of the periphery of the high pressure stage pintle 59. When the high pressure stage cylinder 35 and the high pressure stage rotor 31 occupy the positions in which they are respectively shown in FIG. 25, the groove 163 in the high pressure stage pintle 59 is connected by a passageway 164 extending through the bushing 129 and the vane 74 of the high pressure stage rotor 31 to the compression chamber 81 of the high pressure stage of the compressor so that air under pressure can flow from the compression chamber 81 to the discharge passageway 144 and thence to the storage reservoir.

As shown in FIGS. 22 and 26, the discharge passageway 144 in the high pressure stage pintle 59 is also connected by a twelfth port 165 to an eighth groove 166 formed on a portion of the periphery of the high pressure stage pintle 59. When the high pressure stage cylinder 35 and the high pressure stage rotor 31 occupy the positions in which they are respectively shown in FIG. 26, the bushing 129 which rotates with the high pressure stage rotor 31 cuts off flow from the pintle groove 166 to the compression chamber 82 of the high pressure stage of the compressor.

As shown in FIG. 18, the high pressure stage pintle 59 is provided with a bore 167 extending longitudinally through the center thereof. Referring to FIG. 5 it may be understood that the purpose of the bore 167 is to provide an escape for any fluid under pressure that may leak into a chamber 168 formed between the lower end of the high pressure pintle 59 and the high pressure rotor 31 via the bore 167 and a port 169 formed in the housing 61.

In order to provide for the lubrication of the bearings 3, 4, 21, 22, 23, 24, 32, 33, 36 and 37 (FIGS. 4 and 5), a suction type of oil pump 170 is provided. As shown in FIG. 4, the oil pump 170 has a drive shaft 171, the right-hand end of which has a tongue that fits in a groove 172 formed at the left-hand end of the main drive shaft 2 in order that the pump 170 may be directly driven from the main drive shaft 2. As shown in FIG. 4, the compressor casing 5 is provided with an oil sump or chamber 173 which may be filled with a suitable grade of lubricating oil through a removable filling plug 174. The suction type oil pump 170 sucks or withdraws oil from the oil sump or chamber 173 through a pipe 175 (see FIG. 2) connected to sump 173 and discharges oil under pressure through a pipe 176. As shown in FIG. 1, the compressor casing 5 is provided with a threaded boss 177 into which is screw-threaded the stud portion of a compression fitting 178 to which the pipe 176 is connected by a thimble (not shown) and a nut 179. The casing 5 is provided with a plurality of interconnecting drilled passageways only certain ones of which are shown in the drawings through which passageways the oil under pressure from the discharge pipe 176 is conveyed to the various bearings 3, 4, etc. In order to provide for lubrication of the gears 9 and 10, the drilled passageways in the casing 5 also lead to two discharge orifices 180 and 181 which are shown in FIG. 5. The oil under pressure discharged through the orifice 180 is sprayed onto the teeth of the gear 9. Likewise, the oil discharged from the orifice 181 is sprayed onto the teeth of the gear 10.

As viewed in FIG. 3, the gear 10, and likewise the gear 9 shown in FIG. 4, are rotated clockwise by the drive pulley 1 shown in FIG. 1, since these gears and the pulley are all keyed to the shaft 2. Therefore, the lubricating oil sprayed onto the teeth of the gears 9 and 10 is carried thereby to the teeth of the respective meshing gears 13 and 17 to provide lubrication for or an oil film between the meshing teeth of gears 9 and 13 and between the meshing teeth of the gears 10 and 17, respectively.

In order to insure proper lubrication between the meshing teeth on the gears 10 and 28, the drilled passageways in the casing 5 lead to a discharge orifice 182 formed in a plug 183 press-fitted into a bore 184 formed in casing 5, as shown in FIG. 3. The oil under pressure discharged through the orifice 182 is sprayed onto the teeth of the gear 28 and is then carried thereby to the line of contact between a tooth on the gear 28 and a tooth on the gear 10 to provide an oil film therebetween for effecting the lubrication of these gears. Likewise, proper lubrication between the meshing teeth on the gears 9 and 40 is provided by a discharge orifice 185 formed in a plug 186 press-fitted into a bore 187 also formed in casing 5, as shown in FIG. 5. Oil under pressure supplied to the orifice 185 by one branch of the drilled passageways in the casing 5 is sprayed onto the teeth of the gear 40 and carried thereby to the line of contact between a tooth on the gear 40 and a tooth on the gear 9 to provide an oil film therebetween for effecting the lubrication of these gears.

The oil that is sprayed onto the gears may drain therefrom and flow back into the oil sump 173, as is evident in FIG. 4, from whence it is recirculated by the oil pump 170.

In order to prevent leakage of oil into the chambers 46 and 63, respectively, oil seals 188 and 189 are provided on the upper side, as viewed in FIG. 5, of the respective bearings 23 and 36. In order to prevent leakage of oil from the bearings 21 and 32 into the respective compression chambers of the low pressure stage and the high pressure stage of the compressor, oil seals 190 and 191 are likewise provided on the upper side of the respective bearings 21 and 32. Also, to prevent leakage of oil into the chambers 46 and 63, respectively, an O-ring 192 is disposed in a groove formed in the end member 25 to form a seal between the end member 25 and the casing 5, and an O-ring 193 is disposed in a groove formed in the end member 38 to form a seal between the end member 38 and the casing 5, as indicated in FIG. 5.

As shown in FIG. 5, the spacer sleeve 27 and the hollow shaft 15 are provided with a plurality of coaxial circumferentially spaced apertures 194, the purpose of which is to permit the entry of oil into the hollow shaft 15 to effect the lubrication of the bearings 21 and 22 respectively. Likewise, the spacer sleeve 41 and hollow shaft 34 are provided with a plurality of coaxial circumferentially arranged apertures 195 through which oil may enter the hollow shaft 34 to effect the lubrication of the bearings 32 and 33 respectively.

As shown in FIGS. 4 and 5, the pulley end of the compressor casing 5 is closed by an end cover or end member 196 secured to the casing 5 by a plurality of cap screws 197. The end cover 196 cooperates with the casing 5 to form the oil sump 173 and also to prevent the entrance of dirt and other contaminants into the chamber in which the gears 9, 10, 13, 17, 28 and 40 rotate.

It may be noted from FIG. 5 that the outer race of the bearing 23 is retained in place by a retainer ring 198 and a plurality of cap screws 199 which are screw-threaded into the end member 25. Likewise, the outer race of the bearing 36 is rtained in place by a retainer ring 200 and a plurality of cap screws 201 that are screw-threaded into the end member 38. The bearing 21 is retained on the solid shaft 19 against a shoulder 202 formed thereon by a nut 203 screw-threaded on a threaded portion of the solid shaft 19 and a lock washer 204. The bearing 22 is retained against a shoulder 205 formed on the interior of hollow shaft 15 by a nut 206, a lock washer 207 and a second nut 208, which nut 208 cooperates with a second lock washer 209 to retain the inner race of the bearing 24 is place on the hollow shaft 15 and against the spacer sleeve 27, as shown in FIG. 5. It is evident from FIG. 5 that the bearings 32, 33, 36 and 37 in the high pressure stage of the compressor are retained in place by retainer rings and cap screws in the same manner as the corresponding bearings in the low pressure stage of the compressor. Therefore, it is believed that it is not necessary to describe these retaining means in detail.

In order to insure proper balancing, it will be seen from FIG. 4 that the non-circular gear 9 is provided with a hole 210 and two undercut portions 211 and 212 arranged respectively on opposite sides of the hole 210 and extending inward from the opposite faces of the gear. The area of the hole 210 and the area of the undercut portions 211 and 212 respectively are such that the weight of the metal removed by this hole and these undercut portions insures a proper balancing of the non-circular gear 9.

As shown in FIG. 4, the non-circular gear 13 is likewise provided with a hole 213 and two undercut portions 214 and 215 arranged respectively on the opposite sides of the hole 213 and extending inward from the opposite faces of the gear to insure proper balancing of the gear 13.

As shown in FIGS. 3 and 4, proper balancing of the non-circular gear 10 is provided by three holes 216, 217 and 218 therein shown in FIG. 3 and two undercut portions 219 and 220 (FIG. 4) arranged respectively on the opposite sides of the gear 10 and extending inward from the faces thereof. The gear 10 is also provided with a counterweight 221 to assist in the balancing of this gear, this counterweight being disposed on the left-hand face of the gear as shown in FIG. 4.

The non-circular gears 17 and 28, which are driven by the non-circular gear 10, are each balanced by the provision of three holes and a counterweight, and an undercut portion on each side of each gear. As shown in FIG. 3, the gear 17 is provided with three holes 222, 223 and 224, and a counterweight 225. As shown in FIG. 4, the gear 17 has two undercut portions 226 and 227 which extend inwardly from the opposite faces of the gear.

As shown in FIG. 3, the non-circular gear 28 is provided with three holes 228, 229 and 230, a counterweight 231, and two undercut portions 232 and 233 (shown in FIG. 5) which extend inwardly from the opposite faces of the gear.

In order to anchor the compressor to such as the frame of a locomotive or the floor of a building, the compressor casing 5 is provided with a pair of feet at each end thereof. As shown in FIG. 2, the feet adjacent the intercooler end of the compressor are designated by the numerals 234 and 235 respectively. The feet at the pulley end of the compressor are indicated by the numerals 236 and 237 respectively, as shown in FIG. 3. Each of the four feet is provided with a bore for receiving an anchor bolt for anchoring the compressor to such as the frame of the locomotive or the floor of a building.

A safety valve 238 is provided between the outlet of the intercooler 106 and the high pressure stage inlet passageway 132, as indicated in FIG. 5, to prevent excessive buildup of pressure in the intercooler 106 if, for any reason, the high pressure stage of the compressor would fail to operate.

In order to prevent the lubricating oil that is supplied to the bearing 4 (FIG. 4) for lubricating this bearing from leaking along the drive shaft 2 to the exterior of the compressor casing 5 where it would be thrown onto the left-hand side of the pulley 1, as viewed in FIG. 4, a bushing 239 and an oil seal 240 are disposed in concentric relation around the shaft 2 on the right-hand side of the bearing 4. The bushing 239, which is on the right-hand side of the inner race of the bearing 4, is held in place by a lock nut 241 and a lock washer 242, the lock nut being screw-threaded onto a threaded portion of the drive shaft 2.

The bearing housing 6 (FIG. 4) is provided with a circumferential groove 243 in which is inserted an O-ring seal 244 which is effective to provide a seal between the bearing housing 6 and the compressor casing 5 thereby preventing the entrance of dirt and other contaminants into the chamber in which the gears 9, 10, etc., rotate.

In order to permit the escape of any air under pressure that may leak through the clearance provided for a turning fit between the blades 52 and 53 of the low pressure cylinder 16 and the hub portion of the low pressure rotor 20, the hollow shaft 15 is provided adjacent its upper end, as viewed in FIG. 5, with a pair of apertures 244 and 245 arranged 180° apart through which this air under pressure may flow to the chamber 46 and thence through the outlet duct 51 in the housing 44 to atmosphere. The hollow shaft 34 of the high pressure stage of the compressor is provided with a pair of apertures 247 and 248 for the same purpose.

*Operation*

In operation, let it be assumed that a diesel engine of a locomotive or a stationary diesel engine which drives the compressor is stopped, and that the main air storage reservoir connected to the high pressure stage discharge chamber 140 (FIG. 5) is at atmospheric pressure. Further assume that the non-circular gears 10, 17 and 28 occupy the respective meshing positions in which they are shown in FIG. 3, it being understood that the non-circular gears 9, 13 and 40 also occupy respective meshing positions. It will be noted from FIG. 4 that the non-circular gears 9 and 10 are so mounted on the drive shaft 2 that their respective maximum radii are arranged 180° apart. Furthermore, it is evident from FIG. 4 that the non-circular gear 9 meshes with the non-circular gear 13, the rotation of which gear 13 effects rotation of the low pressure stage cylinder 16 since the non-circular gear 13 is keyed by the key 14 (FIG. 5) to the hollow shaft 15 formed integral with the right-hand end of the low pressure stage cylinder 16. Also, it is evident from FIG. 4 that the non-circular gear 10 meshes with the non-circular gear 17, the rotation of which gear 17 effects rotation of the low pressure stage rotor 20 since the non-circular gear 17 is keyed by the key 18 (FIG. 5) to the solid shaft 19 formed integral with the right-hand end of the low pressure stage rotor 20. In view of the above, it is apparent that, when the parts of the compressor occupy the respective positions in which they are shown in the drawings, the instantaneous radius of non-circular gear 9 at the line of tooth contact with the non-circular gear 13 is greater than that of gear 13. In like manner, it is apparent that the instantaneous radius of non-circular gear 10 at the line of tooth contact with non-circular gear 17 is less than that of gear 17 (see FIG. 3).

Furthermore, the blades 52 and 53 on the low pressure stage cylinder 16, and the vanes 55, 56, 57 and 58 on the low pressure stage rotor 20 (FIGS. 25–28) are so disposed that, when the instantaneous radius of the driving gear 9 to the line of contact with the low pressure stage cylinder driven gear 13 is maximum and the instantaneous radius of the driven gear 13 to this line of contact is minimum, and the instantaneous radius of the driving gear 10 to the line of contact with the low pressure stage rotor driven gear 17 is minimum and the instantaneous radius of the driven gear 17 to this point of meshing is maximum, as they are at the instant the drive shaft 2 is in its 0° angular position shown in FIG. 29, the volumes of the low pressure stage compression chambers 76, 77, 78 and 79 are all equal. Conversely, when the instantaneous radius of the driving gear 9 to the line of contact with the low pressure stage cylinder driven gear 13 is minimum and the corresponding instantaneous radius of the low pressure stage driven gear 13 is maximum, and the instantaneous radius of the driving gear 10 to the line of contact with the low pressure stage rotor driven gear 17 is maximum and the corresponding instantaneous radius of the low pressure stage rotor driven gear 17 is minimum, as they are at the instant the drive shaft 2 is in its 180° angular position shown in FIG. 29, the volumes of the compression chambers 76, 77, 78 and 79 are also all equal.

Now let it be assumed that the diesel engine which drives the compressor is started by means of the usual starting apparatus provided for this purpose. Upon starting the diesel engine, the drive shaft 2 upon which the drive pulley 1 is keyed will be rotated clockwise, as viewed in FIG. 3, as required consistently with the design of the ports in the pintle 42. Since the non-circular gear 10 shown in FIGS. 3 and 4, and the non-circular gear 9 shown in FIG. 4 are also keyed to the drive shaft 2, they will be rotated therewith in the same direction. Furthermore, since the non-circular gear 10 meshes respectively with the non-circular gears 17 and 28 (FIG. 3), and the non-circular gear 9 meshes respectively with the non-circular gears 13 and 40, the non-circular gears 17 and 28 will be rotated counterclockwise as viewed in FIG. 3, it being understood that the gears 13 and 40 rotate in the same direction.

Since the driving gears 9 and 10 are so mounted on the drive shaft 2 that their maximum radii are arranged 180° apart, as hereinbefore mentioned, when the non-circular gears 9, 13, 10 and 17 are rotated by the drive pulley 1, the relative angular velocity of the low pressure stage rotor 20 and of the low pressure stage cylinder 16 will progressively decrease and increase, in succession, as rotation of drive shaft 2 from its 0° angular position to its 360° angular position occurs, as illustratively shown in FIG. 29.

Therefore, it is apparent that when the instantaneous angular velocity of the low pressure stage cylinder 16 is greater than the instantaneous angular velocity of the low pressure stage rotor 20, the low pressure stage cylinder blades 52 and 53 will move respectively toward the low pressure stage rotor vanes 55 and 57 to effect a decrease respectively in the volumes of the chambers 79 and 77, and simultaneously away from the low pressure stage rotor vanes 56 and 58 to effect an increase respectively in the volumes of the chambers 76 and 78.

It is apparent from FIGS. 3 and 4 that since gear 9 is rotating clockwise, the radius of the driving gear 9 to the line of contact with the low pressure stage cylinder driven gear 13 is decreasing and the radius of the low pressure stage cylinder driven gear 13 to this line of contact is increasing. Likewise, the radius of the driving gear 10 (shown in FIG. 3) to the line of contact with the low pressure stage rotor driven gear 17 is increasing and the radius of the low pressure stage rotor driven gear 17 to this line of contact is decreasing. Therefore, it follows that while the angular velocity of the low pressure stage cylinder 16 is greater than the angular velocity of the low pressure stage rotor 20, the angular velocity of the low pressure stage cylinder 16 is decreasing and the angular velocity of the low pressure stage rotor 20 is increasing, as clockwise rotation of drive shaft 2 and non-circular gears 9 and 10, as viewed in FIG. 3, is effected by the drive pulley 1 through the angle between 0° and 102°, indicated in FIG. 29. Consequently, when the instantaneous angular velocity of the low pressure stage cylinder 16 and the instantaneous angular velocity of the low pressure stage rotor 20 become equal, at the 102° angular position of drive shaft 2 as indicated in FIG. 29, the volumes of the respective compression chambers 79 and 77, as indicated on the volume curve for these chambers shown in FIG. 29, are a minimum and the volumes of the respective compression chambers 76 and 78, as indicated on the volume curve for these chambers shown in FIG. 29, are a maximum. As gears 9 and 10 continue to rotate from the position at which the instantaneous angular velocities of the low pressure stage cylinder 16 and the low pressure stage rotor 20 are equal, the angular velocity of the low pressure stage cylinder 16 continues to decrease and the angular velocity of the low pressure stage rotor 20 continues to increase. Therefore, the angular velocity of the low pressure stage rotor 20 becomes greater than the angular velocity of the low pressure stage cylinder 16. Consequently, when the instantaneous angular velocity of the low pressure stage rotor 20 is greater than the instantaneous angular velocity of the low pressure stage cylinder 16, the vanes 55 and 57 on the low pressure stage rotor 20 will move respectively away from the blades 52 and 53 on the low pressure stage cylinder 16 to effect an increase respectively in the volumes of the compression chambers 79 and 77. Likewise, the vanes 56 and 58 on the low pressure stage rotor 20 will move respectively toward the blades 52 and 53 on the low pressure stage cylinder 16 to effect a decrease respectively in the volumes of the compression chambers 76 and 78. The volumes of the compression chambers 79 and 77 will continue to increase and the volumes of the compression chambers 76 and 78 will continue to decrease as the gears 9 and 10 continue to drive the respective gears 13 and 17 until these gears reach the position in which the angular velocity of the low pressure stage rotor 20 becomes maximum, as indicated on the angular velocity curve for the low pressure stage rotor 20, shown in FIG. 29, and the angular velocity of the low pressure stage cylinder 16 becomes minimum, as indicated on the angular velocity curve for the low pressure stage cylinder 16, shown in FIG. 29, in which position the instantaneous radius of driven gear 17 to the line of tooth contact with the driving gear 10 is minimum and the instantaneous radius of driven gear 13 to the line of tooth contact with the driving gear 9 is maximum.

The gears 9 and 10, in rotating from the 0° angular position of drive shaft 2, to the 180° angular position of drive shaft 2, as indicated in FIG. 29, cause the angular velocity of the low pressure stage cylinder 16 to decrease from a maximum to a minimum and to cause the angular velocity of the low pressure rotor 20 to increase from a minimum to maximum. When the gears 9 and 10 are thus respectively rotated through the angle corresponding to 180° of rotation of the drive shaft 2, the gear 13 and low pressure stage cylinder 16 rotated thereby, and the gear 17 and the low pressure stage rotor 20 rotated thereby, are correspondingly rotated to a position in which the volumes of compression chambers 76, 77, 78 and 79 are all equal, as indicated in FIG. 29.

Further clockwise rotation of drive shaft 2 and the non-circular gears 9 and 10, as viewed in FIG. 3, by the drive pulley 1 through the angle between 180° and 258° indicated in FIG. 29, is effective to increase the instantaneous radius of driven gear 17 to the line of tooth contact with the driving gear 10 from minimum to maximum and to decrease the instantaneous radius of driven gear 13 to the line of tooth contact with the driving gear 9 from maximum to minimum. Therefore, as indicated in FIG. 29, the angular velocity of the low pressure stage rotor 20 decreases and the angular velocity of the low pressure stage cylinder 16 increases, as is shown by the respective angular velocity curves for the low pressure stage rotor 20 and the low pressure stage cylinder 16, until the instantaneous angular velocity of the low pressure stage rotor 20 and the instantaneous angular velocity of the low pressure stage cylinder 16 become equal, as is indicated in FIG. 29 for the 258° position of the drive shaft 2.

Since the angular velocity of the low pressure stage cylinder 16 is less than the angular velocity of the low pressure stage rotor 20 but is increasing from the 180° to 258° range of rotation of drive shaft 2, and likewise the angular velocity of the low pressure stage rotor 20 is greater than the angular velocity of the low pressure stage cylinder 16 but is decreasing for this range of rotation of the drive shaft 2, the vanes 56 and 58 of the low pressure stage rotor 20 will move respectively toward the blades 52 and 53 of the low pressure stage cylinder 16 to effect a decrease in the volume of the respective compression chambers 76 and 78 until the volumes of these chambers are minimum, as indicated at the 258° position of drive shaft 2 on the volume curve, shown in FIG. 29, for compression chambers 76 and 78.

Simultaneously, the vanes 55 and 57 of the low pressure stage rotor 20 will move respectively away from the blades 52 and 53 of the low pressure stage cylinder 16 to effect an increase in the volume of the respective compression chambers 79 and 77 until the volumes of these chambers are maximum, as indicated at the 258° position of drive shaft 2 on the volume curve, shown in FIG. 29, for compression chambers 79 and 77.

Now as the drive pulley 1 rotates the drive shaft 2 through the angle between 258° and 360° indicated in FIG. 29, the instantaneous radius of driven gear 17 to the point of tooth contact with the driving gear 10 will decrease from maximum to minimum. Simultaneously, the instantaneous radius of driven gear 13 to the point of tooth contact with the driving gear 9 will increase from minimum to maximum. These changes in radii effect corresponding changes in angular velocity to simultaneously increase the angular velocity of the low pressure stage cylinder 16 and decrease the angular velocity of the low pressure stage rotor 20. Consequently, the angular velocity of the low pressure stage cylinder 16 will increase from the value indicated at the 258° position of drive shaft 2 in FIG. 29 to the value indicated at the 360° position on the angular velocity curve for the low pressure stage cylinder 16, and the angular velocity of the low pressure stage rotor 20 will decrease from the value indicated by the 258° position of drive shaft 2 to the value indicated at the 360° position on the angular velocity curve for the low pressure stage rotor 20, respectively.

Because the angular velocity of the low pressure stage cylinder 16 becomes greater than the angular velocity of the low pressure stage rotor 20 and increases, and the angular velocity of the low pressure stage rotor 20 becomes less than the angular velocity of the low pressure stage cylinder 16 and decreases, as the drive pulley 1 rotates the shaft 2 through the angle between 258° and 360° indicated in FIG. 29, the low pressure stage cylinder blades 52 and 53 will move respectively toward the low pressure stage rotor blades 55 and 57 to effect a decrease respectively in the volumes of the chambers 79 and 77, and simultaneously away from the respective low pressure rotor blades 56 and 58 to effect an increase respectively in the volumes of the chambers 76 and 78.

From the above, and by reference to the curves shown in FIG. 29, it will be appreciated that as the low pressure stage cylinder 16 is rotated by the non-circular driving gear 9 and the non-circular driven gear 13, and as the low pressure stage rotor 20 is rotated by the non-circular driving gear 10 and the non-circular driven gear 17, the respective angular velocities, and consequently the speeds of the low pressure stage cylinder 16 and the low pressure stage rotor 20 are varied. The effect of this variation in angular velocity or speed is when the angular velocity of the cylinder 16 exceeds the angular velocity of the rotor 20, to move the low pressure stage cylinder blades 52 and 53 toward the respective low pressure rotor vanes 55 and 57 to decrease the volumes of the respective compression chambers 79 and 77 and simultaneously away from the respective vanes 56 and 58 to increase the volumes of the respective compression chambers 76 and 78. Furthermore, the effect of this variation in angular velocity is when the angular velocity of the rotor 20 exceeds the angular velocity of the cylinder 16, to move the rotor vanes 56 and 58 respectively toward the cylinder blades 52 and 53 to decrease the volumes of the respective compression chambers 76 and 78, and simultaneously to move the rotor vanes 55 and 57 respectively away from the cylinder blades 52 and 53 to increase the volumes of the respective compression chambers 79 and 77.

Now let it be assumed that at the time the diesel engine was started, the low pressure stage cylinder 16 and the low pressure stage rotor 20 occupied the respective positions in which they are shown in FIGS. 25, 26, 27 and 28 of the drawings, which positions correspond to the angular position of 338° of the drive shaft 2, shown in FIG. 29. When the low pressure stage cylinder 16 and the low pressure stage rotor 20 occupied the respective positions in which they are shown in FIGS. 25, 26, 27 and 28 of the drawings, the low pressure stage compression chamber 76 was charged with air at atmospheric pressure via intake filter 90, nipple 89, passageways 87 and 86 (FIG. 1), port 99 (FIG. 11), intake passageway 94 in low pressure stage pintle 42, port 110, groove 111 and passageway 112 (FIG. 27) in vane 56 of low pressure stage rotor 20. Also, the low pressure stage compression chamber 78 was charged with air at atmospheric pressure via intake filter 90, nipple 89, passageways 87 and 86, port 100 (FIG. 11), intake passageway 96, port 113, and groove 114 in the low pressure stage pintle 42, and passageway 115 (FIG. 26) in vane 58 of low pressure stage rotor 20.

Furthermore, when the low pressure stage cylinder 16 and the low pressure stage rotor 20 occupied the respective positions in which they are shown in FIGS. 25, 26, 27 and 28, air was trapped in the respective low pressure stage compression chambers 77 and 79, as has hereinbefore been explained.

Consequently, when the diesel engine was started and the low pressure stage cylinder 16 and the low pressure stage rotor 20 began to rotate in a counterclockwise direction, as viewed in FIGS. 25, 26, 27 and 28 from the respective positions in which they are shown, it should be evident, from what has been hereinbefore said in regard to the non-circular gears 9, 13 and 10, 17, that these gears respectively effect counterclockwise rotation of the low pressure stage cylinder 16 and the low pressure stage rotor 20. From FIG. 29, it will be seen that when the drive shaft 2 occupies an angular position of 338°, the angular velocity of the low pressure stage cylinder 16 is greater than the angular velocity of the low pressure stage rotor 20 and will increase as the drive shaft 2 is turned through the angle between 338° and 360° or 0°. Furthermore, it will be seen from FIG. 29 that when the drive shaft 2 occupies an angular position of 338°, the angular velocity of the low pressure stage rotor 20 is less than the angular velocity of the low pressure cylinder 16 and will decrease as the drive shaft 2 is turned through the angle between 338° and 360°. Therefore, it follows that as the low pressure cylinder 16 and low pressure rotor 20 are rotated counterclockwise by drive shaft 2 and the respective non-circular gears 9, 13 and 10, 17, the respective blades 52 and 53 of the low pressure cylinder 16 move toward the vanes 55 and 57 respectively of the low pressure rotor 20 and away from the respective vanes 56 and 58 of this rotor.

As hereinbefore stated, air is trapped in the compression chambers 77 and 79. Consequently, as the respective blades 52 and 53 of the low pressure cylinder 16 move toward the vanes 55 and 57 respectively of the low pressure rotor 20, the volume of the respective chambers 77 and 79 is reduced. As is well known from thermodynamics, a reduction in the volume of air trapped in a chamber is effective to increase the pressure of the air so trapped. Therefore, as the volume of the respective compression chambers 77 and 79 is thus reduced, the pressure of the air trapped in these chambers is increased.

Consequently, the low pressure stage cylinder, rotor and pintle may be so designed that, when the low pressure stage cylinder 16 and the low pressure stage rotor 20 have been rotated respectively beyond the position occupied thereby in the 360° or 0° position of the drive shaft 2 to a position which is sufficient to increase the pressure of the air being compressed in compression chambers 77 and 79 to a desired discharge pressure, the passageway 126 in vane 57 establishes a discharge communication from the compression chamber 77 to the intercooler 106 via passageway 126, groove 121, port 120 in the low pressure pintle 42 (FIG. 15), discharge passageway 95, port 102 (FIG. 10), low pressure discharge passageway 92 (FIG. 5), and flange fitting 104. Likewise, at the same time, the passageway 127 in the vane 55 establishes a discharge communication from the chamber 79 to the intercooler 106 via the passageway 127, groove 123, port 122 (FIG. 12), discharge passageway 97, port 101 (FIG. 10), low pressure discharge passageway 92 (FIG. 5), and flange fitting 104.

Simultaneously, as the low pressure stage cylinder 16 and the low pressure rotor 20 are rotated through the above-mentioned angle from the 338° position of the drive shaft to and beyond the 360° or 0° position of the drive shaft, the respective blades 52 and 53 of the low pressure stage cylinder 16 move away from the respective vanes 56 and 58 of the low pressure stage rotor 20 to effect an increase in the volume of the respective compression chambers 76 and 78.

As the volume of the compression chamber 76 is thus increased, atmospheric air will flow into the compression chamber 76 via intake filter 90, nipple 89, passageways 87 and 86 (FIG. 1), port 99 (FIG. 11), intake passageway 94 in low pressure stage pintle 42, port 110, groove 111 (FIG. 14) and passageway 112 in vane 56 of low pressure stage rotor 20. Likewise, as the volume of the compression chamber 78 is increased, atmospheric air will flow into the compression chamber 78 via intake filter 90, nipple 89, passageways 87 and 86 (FIG. 1), port 100 (FIG. 11), intake passageway 96, port 113, and groove 114 in the low pressure stage pintle 42 (FIG. 13) and passageway 115 in vane 58 of the low pressure stage rotor 20.

It will be seen from FIG. 29 that when the drive shaft 2 has rotated through the angle between 338° and 360° or 0°, the angular velocity of the low pressure stage cylinder 16 has increased to its maximum and the angular velocity of the low pressure stage rotor 20 has decreased to its minimum. Also, it is apparent from FIG. 29 that in this drive shaft position, the volumes of the compression chambers 76, 77, 78, and 79 are all equal.

Now as the drive shaft 2 is rotated clockwise past the 360° or 0° position, it is apparent from FIG. 29 that the angular velocity of the low pressure stage cylinder 16 begins to decrease from its maximum value and the angular velocity of the low pressure stage rotor 20 begins to increase from its minimum value. Therefore, upon the drive shaft 2 passing through the 0° position, the angular velocity of the low pressure stage cylinder 16 ceases to increase in value and begins to decrease in value, and the angular velocity of the low pressure stage rotor 20 ceases to decrease in value and begins to increase in value.

As the drive shaft 2 is rotated through the angle between 0° and 102°, it is apparent from FIG. 29 that the angular velocity of the low pressure stage cylinder 16 decreases and the angular velocity of the low pressure stage rotor 20 increases until the angular velocities of these two members are equal at which time the volumes of the respective compression chambers 76 and 78, into which air is being drawn from atmosphere, as hereinbefore explained, are maximum, and the volumes of the respective compression chambers 77 and 79, from which air under pressure is being discharged to the intercooler 106, are minimum.

The peripheral length of the respective pintle grooves 111 (FIG. 14) and 114 (FIG. 13) is such that, when the drive shaft 2 is rotated to its 102° position, the low pressure stage rotor 20 is correspondingly rotated from the position in which it is shown in FIGS. 25, 26, 27 and 28 to a position in which the passageway 112 in the vane 56 of the low pressure stage rotor 20 just completely closes communication between the pintle groove 111 (FIG. 14) and the compression chamber 76 so that the chamber 76 is cut off from atmosphere, and the passageway 115 in the vane 58 of the low pressure stage rotor 20 just completely closes communication between the groove 114 (FIG. 13), and the compression chamber 78 so that the respective compression chambers 76 and 78 are cut off from atmosphere. Consequently, air at atmospheric pressure is now trapped in the respective compression chamber 76 and 78.

Also, the peripheral length of the respective pintle grooves 121 (FIG. 15) and 123 (FIG. 12) is such that when the low pressure stage rotor 20 is rotated to the above-mentioned position, the passage 126 in the vane 57 of the low pressure stage rotor 20 just completely closes communication between the pintle groove 121 (FIG. 15) and the compression chamber 77 so that the compression chamber 77 is cut off from the discharge passageway 95 that leads to the intercooler 106, and the passageway 127 in the vane 55 of the low pressure stage rotor 20 just completely closes communication between the pintle groove 123 (FIG. 12) and the compression chamber 79 so that the compression chamber 79 is cut off from the discharge passageway 97 that also leads to the intercooler 106.

From the above, it will be understood that the volumes of the compression chambers 76 and 78 are now maximum and are filled with air from atmosphere, and the volumes of the compression chambers 77 and 79 are now minimum and are filled with residual air remaining therein after these chambers are cut off from the respective discharge passageways 95 and 97 in the low pressure stage pintle 42.

It will be seen from FIG. 29 that, as the drive shaft 2 is rotated through the angle between 102° and 180°, the angular velocity of the low pressure stage rotor 20 increases from the value at which it is equal to the angular velocity of the low pressure stage cylinder 16 to its maximum value, and the angular velocity of the low pressure stage cylinder 16 decreases from the value at which it is equal to the angular velocity of the low pressure stage rotor 20 to its minimum value. Therefore, as the angular velocity of the low pressure stage rotor 20 increases, and the angular velocity of the low pressure stage cylinder 16 decreases, the vanes 55 and 57 of the low pressure stage rotor 20 move away from the respective blades 52 and 53 of the low pressure stage cylinder 16 to effect an increase in the volumes of the respective compression chambers 79 and 77 thereby to cause a re-expansion of the residual air remaining in these chambers until the low pressure stage rotor 20 has been rotated counterclockwise to the position in which the passageway 127 in the vane 55 establishes a communication between the compression chamber 79 and the pintle groove 109 (FIG. 12), and the passageway 126 in the vane 57 establishes a communication between the compression chamber 77 and the pintle groove 117 (FIG. 15) respectively. At the time the passageways 126 and 127 in the respective vanes 57 and 55 of the low pressure stage rotor 20 begin to establish the respective communications between the compression chambers 77 and 79 and the pintle grooves 117 and 109, respectively, the re-expansion of the air in the chambers 77 and 79 has reduced the pressure in these chambers to substantially atmospheric pressure. Thereafter, as the volumes of the respective compression chambers 77 and 79 continue to increase until the drive shaft 2 has been rotated to its 180° position, atmospheric air will be drawn respectively into the compression chamber 77 via intake filter 90, nipple 89, passageways 87 and 86 (FIG. 1), port 100 (FIG. 11), intake passageway 96, port 116 and groove 117 (FIG. 15) in the low pressure stage pintle 42, and passageway 126 in vane 57, and into the compression chamber 79 via intake filter 90, nipple 89, passageways 87 and 86 (FIG. 1), port 99 (FIG. 11), intake passageway 94, port 108 and groove 109 (FIG. 12) in the low pressure stage pintle 42, and passageway 127 in vane 55.

Furthermore, as the angular velocity of the low pressure stage rotor 20 increases and the angular velocity of the low pressure cylinder 16 decreases as the drive shaft 2 is rotated through the angle between 102° and 180°, the vanes 56 and 58 of the low pressure rotor 20 move toward the respective blades 52 and 53 of the low pressure stage cylinder 16 to effect a decrease in the volumes of the respective compression chambers 76 and 78 from their maximum values until the volumes of all the compression chambers 76, 77, 78 and 79 are equal as is apparent from FIG. 29.

The above-mentioned decrease in the volumes of the respective compression chambers 76 and 78 from their maximum values is effective to compress the atmospheric air that was trapped, as hereinbefore explained, in these compression chambers as the drive shaft 2 is rotated past its 102° position.

Now when the drive shaft 2 has rotated beyond its 180° position to a position which is sufficient to cause an increase in the pressure of the air being compressed in the compression chambers 76 and 78 to a desired discharge pressure, the passageway 112 in vane 56 of the low pressure stage rotor 20 establishes a discharge communication from the compression chamber 76 to the intercooler 106 via the passageway 112, pintle groove 125 (FIG. 14), port 124, and discharge passageway 97 (FIG. 14) in low pressure pintle 42, port 101 (FIG. 10) in the pintle 42, low pressure discharge passageway 92 (FIG. 5), and flange fitting 104. Likewise the passageway 115 in the vane 58 of the low pressure stage rotor 20 establishes a discharge communication from the compression chamber 78 to the intercooler 106 via the passageway 115, pintle groove 119 (FIG. 13), port 118 and discharge passageway 95 (FIG. 13) in low pressure pintle 42, port 102 (FIG. 10) in the pintle 42, low pressure discharge passageway 92 (FIG. 5), and flange fitting 104.

Simultaneously, as the drive shaft 2 is rotated beyond its 180° position to cause an increase in the pressure of the air being compressed in the respective compression chambers 76 and 78 to the desired discharge pressure, the vanes 55 and 57 of the low pressure stage rotor 20 continue to move away from the respective blades 52 and 53 of the low pressure stage cylinder 16 to effect a further increase in the volumes of the respective compression chambers 79 and 77 whereupon additional atmospheric air will be drawn into these chambers until the drive shaft 2 has been rotated to its 258° position in which position, as will be seen from FIG. 29, the volumes of the compression chambers 79 and 77 are maximum, and the volumes of the compression chambers 76 and 78 from which air under pressure is being discharged to the intercooler 106 are minimum.

The peripheral length of the respective pintle grooves 125 (FIG. 14) and 119 (FIG. 13) are such that, when the drive shaft 2 is rotated to its 258° position, the low pressure stage rotor 20 is correspondingly rotated to a position in which the passageway 112 in the vane 56 of the low pressure stage rotor 20 just completely closes communication between the pintle groove 125 (FIG. 14) and the compression chamber 76 so that the chamber 76 is cut off from the discharge passageway 97 in the low pressure stage pintle 42, which passageway 97 leads, as hereinbefore explained, to the intercooler 106. Likewise, the passageway 115 in the vane 58 of the low pressure stage rotor 20 just completely closes communication between the pintle groove 119 (FIG. 13) and the compression chamber 78 so that the chamber 78 is cut off from the discharge passageway 95 in the low pressure stage pintle 42, which passageway 95 also leads, as hereinbefore explained, to the intercooler 106.

When the respective compression chambers 76 and 78 are cut off from the intercooler 106, as just explained, it will be appreciated that thereafter these chambers are filled with residual air remaining therein until these chambers are subsequently opened to atmosphere, as will hereinafter be explained.

Also, the peripheral lengths of the respective pintle grooves 117 (FIG. 15) and 109 (FIG. 12) are such that when the low pressure stage rotor 20 is rotated to the position corresponding to the 258° position of the drive shaft 2, the passageway 126 in the vane 57 of the low pressure stage rotor 20 just completely closes communication between the pintle groove 117 (FIG. 15) and the compression chamber 77 so that the chamber 77 is cut off from the intake passageway 96 which is open to atmosphere, as hereinbefore explained, and the passageway 127 in the vane 55 of the low pressure stage rotor 20 just completely closes communication between the pintle groove 109 (FIG. 12) and the compression chamber 79 so that the chamber 79 is cut off from the intake passageway 94 which is open to atmosphere, as hereinbefore explained. Therefore, when the drive shaft 2 reaches its 258° position, the respective compression chambers 77 and 79 have their maximum volume, are cut off from atmosphere, and are completely filled with air at atmospheric pressure.

By referring to FIG. 29, it will be seen that subsequent to the drive shaft 2 passing through its 258° position, the angular velocity of the low pressure stage cylinder 16 increases from the value at which it is equal to the angular velocity of the low pressure rotor 20, and the angular velocity of the low pressure stage rotor 20 decreases from the value at which it is equal to the angular velocity of the low pressure cylinder 16, as the drive shaft 2 is rotated to its 338° position, in which position the rotating parts of the air compressor were assumed to be in when the diesel engine that drives the compressor was started. Therefore, as the angular velocity of the low pressure stage cylinder 16 increases, and the angular velocity of the low pressure stage rotor 20 decreases as the drive shaft 2 is rotated through the angle between its 258° position and its 338° or original position, the respective blades 52 and 53 of the low pressure stage cylinder 16 move away from the respective vanes 56 and 58 of the low pressure stage rotor 20 to effect an increase in the volumes of the respective compression chambers 76 and 78 from their minimum values. Likewise, these respective blades 52 and 53 move toward the respective vanes 55 and 57 of the low pressure stage rotor 20 to effect a decrease in the volumes of the respective compression chambers 79 and 77 from their maximum values.

The above-mentioned increase in the volumes of the respective compression chambers 76 and 78 causes a re-expansion of the residual air remaining in these chambers until the pressure thereof is substantially the same as atmospheric pressure. When the low pressure stage cylinder 16 and low pressure stage rotor 20 have been rotated to the respective positions in which the volumes of the respective compression chambers 76 and 78 have been increased sufficiently to re-expand the residual air in these chambers down to substantially atmospheric pressure, the passageway 112 in the blade 56 of the low pressure stage rotor 20 establishes a communication between the compression chamber 76 and the pintle groove 111 (FIG. 14), and the passageway 115 in the blade 58 of the low pressure stage rotor 20 establishes a communication between the compression chamber 78 and the pintle groove 114 (FIG. 13) respectively. From FIG. 14, it can be seen that the pintle groove 111 is connected by the port 110 to the intake passageway 94 in the pintle 42, and from FIG. 13, it can be seen that the pintle groove 114 is connected by the port 113 to the intake passageway 96 also in the pintle 42. Since the intake passageways 94 and 96 are both open to atmosphere, as has hereinbefore been explained, air at atmospheric pressure will now flow into the respective compression chambers 76 and 78, completely filling these chambers with air at atmospheric pressure.

The above-mentioned decrease in the volumes of the respective compression chambers 79 and 77 from their maximum values, as the drive shaft 2 is rotated through the angle between its 258° position and its 338° or original position, is effective to compress the air at atmospheric pressure that is trapped in these chambers.

When the drive shaft 2 reaches its 338° position, it has made one complete revolution of 360° since the diesel engine was started. From the foregoing, and from FIG. 29, it should be apparent that as the drive shaft 2 is turned through the angle between its 338° position and its 360° or 0° position in its second revolution, air from the atmosphere will continue to flow into the respective compression chambers 76 and 78 and the air trapped in the respective compression chambers 77 and 79 will continue to be compressed.

As the drive shaft 2 is rotated through its second revolution and all subsequent revolutions, it should be apparent that during one half of each complete revolution, air is simultaneously drawn from atmosphere into two compression chambers and compressed in two other compression chambers to a desired pressure and subsequently exhausted therefrom, and during the other half of the revolution, the air drawn from atmosphere into the two compressing chambers is compressed therein to a desired pressure and subsequently exhausted therefrom while air is simultaneously drawn from the atmosphere into the two other compression chambers for compression during the first half of the next revolution of the drive shaft 2.

As has been hereinbefore stated, the high pressure stage of the air compressor of the present invention is identical in construction and operation to the low pressure stage except that the parts of the high pressure stage are proportionately smaller due to the fact that the volume of the air leaving the low pressure stage of the compressor is less than the volume of atmospheric air entering the low pressure stage as a result of the compression of this air in the low pressure stage of the compressor. A detailed analytical description of the operation of the high pressure stage, similar to that previously given for the low pressure stage, is deemed unnecessary. Furthermore, it will be understood that the high pressure stage non-circular rotor driven gear 28 is keyed to the shaft 30 (FIG. 5) so that it bears the same angular relation to the vanes 72, 73, 74 and 75 of the high pressure stage rotor 31 that the low pressure stage non-circular rotor driven gear 17 bears to the vanes 55, 56, 57 and 58 of the low pressure stage rotor 20. Likewise, it will be understood that the high pressure stage non-circular cylinder driven gear 40 is keyed to the hollow shaft 34 (FIG. 5) so that it bears the same angular relation to the blades 69 and 70 of the high pressure stage cylinder 35 that the low pressure stage non-circular cylinder driven gear 13 bears to the blades 52 and 53 of the low pressure stage cylinder 16.

Referring to FIG. 3 of the drawings, it will be seen that a straight line passing through the centers of rotation of the non-circular gears 10 and 28, and a straight line passing through the centers of rotation of the non-circular gears 10 and 17 form an angle of 90°. Likewise, it will be understood that a straight line passing through the centers of rotation of the non-circular gears 9 and 40 and a straight line passing through the centers of rotation of the non-circular gears 9 and 13 form an angle of 90°. Therefore, it is apparent from FIG. 3 that the non-circular gear 10 must rotate clockwise through an angle of 90° before the low pressure stage non-circular rotor driven gear 17 will rotate to the position that corresponds to the position in which the high pressure stage non-circular rotor driven gear 28 occupies in FIG. 3. Likewise, the non-circular gear 9 must rotate clockwise through an angle of 90° before the low pressure stage non-circular cylinder driven gear 13 will be rotated to the position that corresponds to the position in which the high pressure stage non-circular cylinder driven gear 40 occupies in FIG. 5.

Consequently, it follows that the low pressure stage cylinder 16 and low pressure stage rotor 20 must likewise be rotated through the angle effected by rotating the drive shaft 2 through an angle of 90° before they occupy respective angular positions corresponding to the relative angular positions the high pressure stage cylinder 35 and high pressure stage rotor 31 occupy when the high pressure stage non-circular cylinder driven gear 40 occupies the position in which it is shown in FIG. 5, and the high pressure stage non-circular rotor gear 28 occupies the position in which it is shown in FIG. 3. Accordingly, it is evident that the instantaneous performance of the respective rotor 31 and cylinder 35 of the high pressure stage of the compressor always leads the instantaneous performance of the respective rotor 20 and cylinder 16 of the low pressure stage by 90° of rotation of the drive shaft 2.

The fact that the low pressure stage of the compressor lags the high pressure stage is clearly indicated by a comparison of the curves shown in FIG. 29 for the volumes of the several low pressure stage compression chambers 76–78 and 77–79, the angular velocity of the low pressure stage rotor 20, and the angular velocity of the low pressure stage cylinder 16 with the corresponding curves shown in FIG. 30 for the volumes of the several high pressure stage compression chambers 80–82 and 81–83, the angular velocity of the high pressure stage rotor 31, and the angular velocity of the high pressure stage cylinder 35.

It can be seen from FIG. 29 that the low pressure stage compression chambers 76, 77, 78 and 79 all have equal volumes when the drive shaft 2 is in either its 0° (also 360°) or in its 180° position whereas it can be seen from FIG. 30 that the volumes of the high pressure stage compression chambers 80, 81, 82 and 83 are equal when the drive shaft 2 is in either its 90° or its 270° position. Therefore, it is apparent that when the drive shaft 2 is in its 0° (also 360°) position, the equal volumes of the low pressure stage compression chambers 76, 77, 78 and 79 correspond to the equal volumes of the high pressure stage compression chambers 80, 81, 82 and 83 when the drive shaft 2 is in its 270° position. Likewise, it is apparent from FIGS. 29 and 30 that when the drive shaft 2 is in its 180° position the volumes of the low pressure stage compression chambers 76, 77, 78 and 79 are all equal, whereas the volumes of the high pressure stage compression chambers 80, 81, 82 and 83 are all equal when the drive shaft 2 is in its 90° position.

Furthermore, it can be seen from FIG. 29 that the angular velocity of the low pressure stage rotor 20 is maximum when the drive shaft 2 is in its 180° position and minimum when the drive shaft 2 is in its 0° (also 360°) position whereas it can be seen from FIG. 30 that the angular velocity of the high pressure stage rotor 31 is maximum when the drive shaft 2 is in its 90° position and minimum when the drive shaft 2 is in its 270° position.

In like manner, it can be seen from FIG. 29 that the angular velocity of the low pressure stage cylinder 16 is maximum when the drive shaft 2 is in its 0° (also 360°) position and minimum when the drive shaft 2 is in its 180° position whereas it can be seen from FIG. 30 that the angular velocity of the high pressure stage cylinder 16 is maximum when the drive shaft 2 is in its 270° position and minimum when the drive shaft 2 is in its 90° position.

Consequently, it is evident from the above that the low pressure stage of the compressor lags the high pressure stage 90° of rotation of the drive shaft 2.

It will be understood that while a specific type of non-circular gear and mounting thereof is illustratively shown as employed herein for providing the cyclic speed variations of the cylinder and rotor with respect to each other, other forms of non-circular gears and mounting thereof may also be employed for the same purpose without departing from the spirit of the invention as hereinafter claimed.

Having now described the invention, what I claim as new and desire to secure by Letters Patent is:

1. A multi-stage air compressor of the rotary vane type comprising, in combination:
    (a) a plurality of serially connected air compressing stages having respective tubular casings arranged in side-by-side parallel relationship,
    (b) each of said stages comprising:
        (i) a hollow rotary cylinder coaxially mounted within the corresponding casing,
        (ii) a rotor coaxially mounted within the corresponding hollow rotary cylinder,
        (iii) at least one blade carried by said hollow rotary cylinder and at least one vane carried by said rotor cooperating to form therebetween at least two compressing chambers, said rotor having a longitudinal bore,
        (iv) a sationary cylindrical pintle fixed in said casing and extending into the longitudinal bore of said rotor and having an inlet passageway and a discharge passageway therein opening at the peripheral surface of said pintle,
        (v) said rotor having a passageway for each compressing chamber which alternately registers with said inlet passageway and said discharge passageway in said pintle to effect alternately the admission of air thereto and a discharge of compressed air from each of said compressing chambers,
        (vi) non-circular driven gear means via which said rotor is rotated, and
        (vii) non-circular driven gear means via which said hollow rotary cylinder is rotated,
    (c) a drive shaft having its axis in spaced parallel relationship to the axes of said hollow rotary cylinder and said rotor of each of said stages,
    (d) non-circular drive gear means fixed on said shaft and cooperating with each of said non-circular driven gear means for effecting simultaneous rotation of the hollow rotary cylinder of each of said stages and the rotor each each of said stages in the same direction and at alternately increasing and decreasing speeds in angularly phased relationship to effect alternate increase and decrease in the volume of said at least two compressing chambers, and
    (e) a conduit connecting the discharge passageway in the pintle of one stage with the inlet passageway in the pintle in a succeeding stage.

2. A multi-stage air compressor of the rotary vane type, as claimed in claim 1, further characterized in that the axis of rotation of said drive shaft has such relationship to the axes of rotation of said non-circular driven gear means of each stage that a first line passing through the axis of rotation of said drive shaft and the axis of rotation of one of said non-circular driven gear means of one of said stages and a second line passing through the axis of rotation of said drive shaft and the axis of rotation of one of said non-circular driven means of another of said stages intersect at an angle of 90°.

3. A multi-stage air compressor of the rotary vane type, as claimed in claim 1, further characterized in that 90° of angular rotation of said non-circular drive gear means occurs from the instant that the major axis of one of said non-circular driven gear means of one of said stages coincides with a line passing through the respective axes of rotation of said one non-circular driven gear means and said non-circular drive gear means to the instant that the major axis of one of said non-circular driven gear means of another of said stages coincides with a line passing through the respective axes of rotation of said one of the non-circular driven gear means of said another stage and said non-circular drive gear means.

4. A multi-stage air compressor of the rotary vane type, as claimed in claim 1, further characterized in that the angular position of said drive shaft at which the volumes of the chambers of one pressure stage are maximum leads by 90° the angular position of said drive shaft at which the volumes of the corresponding chambers of a preceding pressure stage are maximum.

5. A multi-stage air compressor of the rotary vane type, as claimed in claim 1, further characterized in that the angular position of said drive shaft at which the volumes of the chambers of one pressure stage are minimum leads by 90° the angular position of said drive shaft at which the volumes of the corresponding chambers of a preceding pressure stage are minimum.

References Cited by the Examiner
UNITED STATES PATENTS

| | | | |
|---|---|---|---|
| 1,121,806 | 12/14 | Cromer | 230—144 |
| 2,148,282 | 2/39 | Stevens | 103—129 |
| 2,426,361 | 8/47 | Lester | 103—129 |
| 2,453,271 | 11/48 | Sales | 103—129 |
| 2,565,860 | 8/51 | Lester | 103—129 |
| 2,620,778 | 12/52 | Duckworth | 103—129 |
| 3,107,846 | 10/63 | Mihalakis | 230—158 |
| 3,112,062 | 11/63 | Way | 230—144 |

References Cited by the Applicant
UNITED STATES PATENTS

| | | |
|---|---|---|
| 3,061,180 | 10/62 | Durgin. |

JOSEPH H. BRANSON, Jr., *Primary Examiner.*
ROBERT M. WALKER, *Examiner.*